United States Patent
Keers et al.

(10) Patent No.: US 7,203,600 B2
(45) Date of Patent: Apr. 10, 2007

(54) GEOPHYSICAL DATA PROCESSING

(75) Inventors: Henk Keers, Cambridge (GB); Henrik Bernth, London (GB); Christopher Chapman, Great Shelford (GB); David Nichols, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 11/016,678

(22) Filed: Dec. 17, 2004

(65) Prior Publication Data

US 2005/0143923 A1 Jun. 30, 2005

(30) Foreign Application Priority Data

Dec. 19, 2003 (GB) ................... 0329367.7

(51) Int. Cl.
*G01V 1/28* (2006.01)

(52) U.S. Cl. ........................................ 702/14

(58) Field of Classification Search ............... 702/14, 702/17, 18
See application file for complete search history.

(56) References Cited

U.S. PATENT DOCUMENTS

| | | | | |
|---|---|---|---|---|
| 3,747,056 A | * | 7/1973 | Treybig et al. | ...... 367/62 |
| 3,760,347 A | * | 9/1973 | Treybig | ...... 367/56 |
| 4,276,620 A | * | 6/1981 | Kahn et al. | ...... 367/60 |
| 2003/0060981 A1 | | 3/2003 | Routh et al. | |
| 2003/0216897 A1 | * | 11/2003 | Endres et al. | ...... 703/10 |

OTHER PUBLICATIONS

Brandsberg-Dahl et al Focusing in dip and AVA compensation on scattering-angle/azimuth common image gathers Geophysics vol. 68, 2003, pp. 232-254.
Canning et al Reducing 3-D acquisition footprint for 3-D DMO and 3-D pre stack migration Geophysics vol. 63, 1998, pp. 1177-1183.
Chen et al A modeling study of borehole radar for oilfield applications Geophysics vol. 67, 2002, pp. 1486-1494.
Miller et al A new slant on seismic imaging: Migration and integral geometry Geophysics vol. 52, 1987, pp. 943-964.
Wang et al GPR imaging using the generalized Radon transform Geophysics vol. 65, 2000, pp. 1553-1559.
Sloan A fast algorithm for constructing Delaunay triangulations in the plane Adv Eng Software, vol. 9, 1987, pp. 34-55.
Yilmaz 3-D Seismic Exploration Seismic Data Analysis: Processing, Inversion, and Interpretation of Seismic Data Society of Exploration Geophysicists, Tulsa, OK, USA, 2001, p. 1019-1020.

* cited by examiner

Primary Examiner—Donald McElheny, Jr.

(57) ABSTRACT

A mehtod of determinig an integral of a function over an n-dimensional intergratio domain from the values of the function at a plurality of discrete data points within the integration domain, comprises partitioning the integration domain into a plurality of k-dimensional simplexes, where k<=n. The function is integrated over each simplex, and the results are summed. The method may be applied in the processing of geophysical data such as, for example, seismic data, where the function is a function of at least the geophysical data. The processed data may then be used to obtain information about the physical properties of the earth's interior.

19 Claims, 21 Drawing Sheets

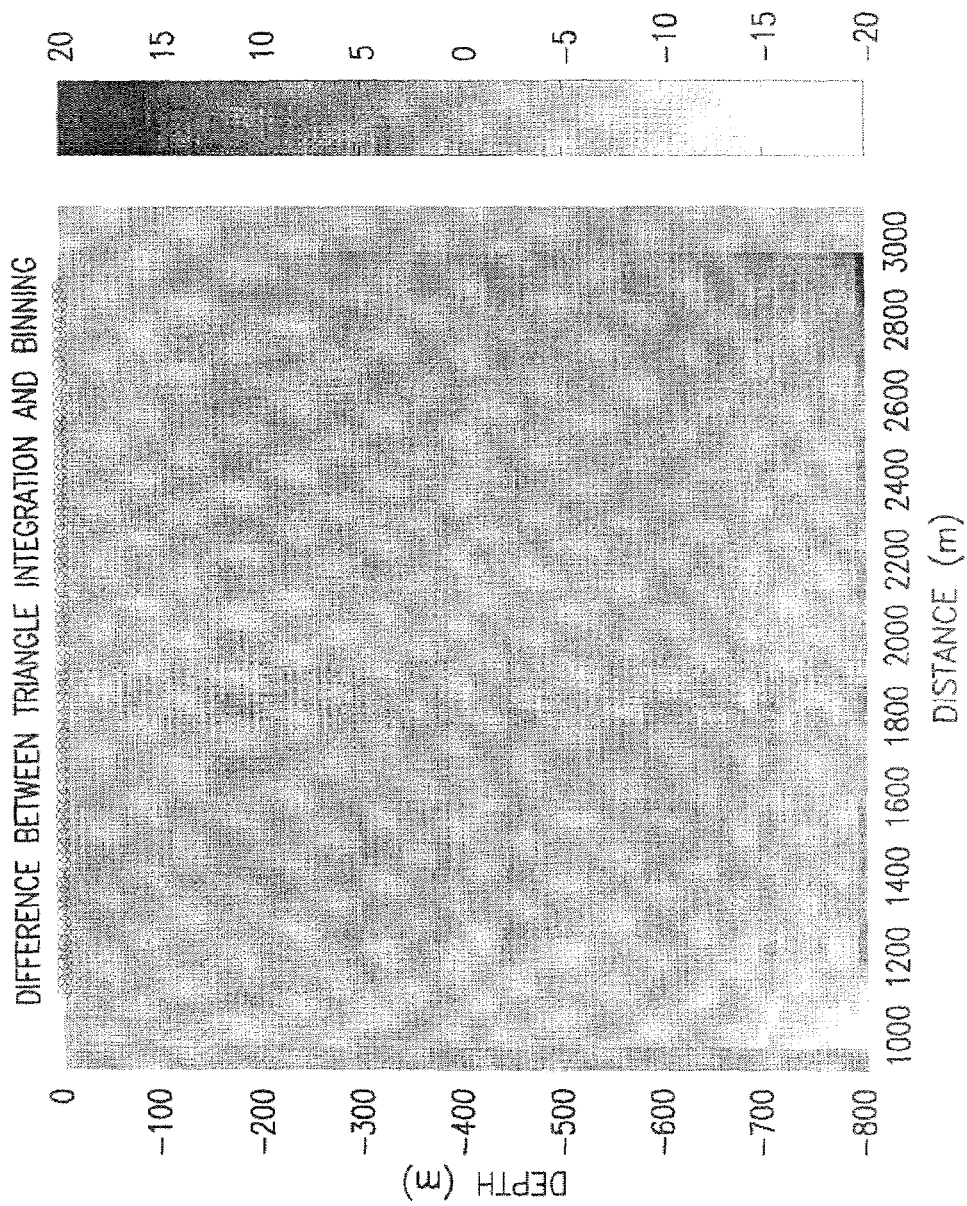

GEOPHYSICAL DATA PROCESSING

FIELD OF THE INVENTION

The present invention relates to a method of processing seismic data or other geophysical data such as electromagnetic data. It is applicable to seismic data processing and migration techniques such as, for example, Kirchhoff migration, beam migration, wave equation migration, multiple attenuation and AVO (amplitude versus offset) analysis.

BACKGROUND OF THE INVENTION

In seismic imaging, as well as in many other areas of seismic data processing, one often needs to compute integrals of the general form:

$$\int_D A\, dV \qquad (1)$$

In equation (1), A is a function to be integrated, and dV is a volume element on D. The integration domain D is a k-dimensional sub-domain of n-dimensional space ($k \leq n$).

The integration can be over, for example, source and receiver positions, midpoints only, midpoint and offsets or scattering angles etc. The integration domain typically is a two-dimensional domain, but it could be of higher dimension. The integrand A contains the seismic data, or part of the seismic data, and may also contain some theoretical terms. Integrals of this type occur in seismic data processing in, for example, migration algorithms (pre stack and post stack migration; time and depth migration; Kirchhoff, beam and wave equation migration), attenuation of multiple reflections in marine data, AVO analysis etc. Where k<n the topography of the acquisition geometry is taken into account—this happens when not only the x and y coordinates of the sources and receivers, but also their z coordinates, are known.

One particular problem in processing seismic data is that the seismic data, and hence the value of the function A, are generally known only at $n_p$ n-dimensional points in the integration domain D. These points at which the seismic data are known will hereinafter be referred to as "data points". Integrals having the form of equation (1) have traditionally been computed using a 'binning' algorithm as described in, for example, "Seismic data processing" by O. Yilmaz in Volume II, Society of Exploration Geophysicists, Tulsa, Okla. p 1019 (2001). A binning algorithm can be implemented in various ways. For example, one can evaluate equation (1) by using a summation in which all the data points are given equal weights:

$$\int_D A\, dV = Vol(D) \sum_{i=1}^{n_p} A_i. \qquad (2)$$

Vol(D) can be estimated roughly, but is often left out altogether in which case equation (2) reduces to:

$$\int_D A\, dV = \sum_{i=1}^{n_p} A_i \qquad (3)$$

Alternatively one can divide the integration domain D up in a large number of 'bins' (typically squares or rectangles in the case of a two-dimensional domain), after which the average value of the function A in each bin is computed (see e.g. Yilmaz, 2001). The integral is then evaluated as the sum of all these average values:

$$\int_D A\, dV = \sum_i \tilde{A}_i Vol(b_i). \qquad (4)$$

In equation (4) $\tilde{A}_i$ denotes the average of all measured values of A in the $i^{th}$ bin, $Vol(b_i)$ is the volume of the $i^{th}$ bin and the summation is over all the bins.

These prior art binning techniques can work reasonably well if the data points are distributed on a regular grid. However, the results are dependent on the binning grid size so that, even if the data points are distributed on a regular grid, errors can result if an unsatisfactory binning grid is applied. Furthermore, the data points acquired in a seismic survey are often not distributed over a regular grid—firstly, it is hard in practice to position the seismic sources and receivers exactly on a regular grid and, secondly, the actual optimal survey grid may be irregular rather than regular. If the data points are irregularly distributed over the integration domain then the prior art binning techniques are subject to further errors and become unreliable.

SUMMARY OF THE INVENTION

A first aspect of the present invention provides a method of processing geophysical data, the method comprising determining an integral of a function of the geophysical data over an n-dimensional integration domain from the values of the function at a plurality of discrete data points within the integration domain, the method comprising the steps of: (a) partitioning the integration domain into a plurality of k-dimensional simplexes, where $k \leq n$; (b) integrating the function over each simplex; and (c) summing the results of step (b).

The term "simplex" as used herein denotes the results of any triangulisation, or its corresponding Voronoi diagrams, of a surface in two dimensions, a tetrahedron in three dimensions and, in general, an n-dimensional shape having n+1 vertices.

The method of the invention provides more reliable results than the prior art binning techniques. The invention is particularly advantageous when applied to a set of irregularly-distributed data points.

A second aspect of the invention provides a method of processing geophysical data, the method comprising determining an integral of a function of the geophysical data over an n-dimensional integration domain from the values of the function at a plurality of discrete data points within the integration domain, wherein the method comprises the steps of: (a) assigning a weight to each data point; (b) multiplying the value of the function at each data point by the weight of the respective data point; and (c) summing the results of step (b).

A third aspect of the invention provides a method of processing geophysical data, the method comprising regularising an array of data points located in an n-dimensional domain, each data point representing the value of a function of the geophysical data at a respective discrete location within the domain, wherein the method comprises the steps of: (a) partitioning the domain into a plurality of k-dimensional simplexes, where $k \leq n$, with each vertex of a simplex being coincident with a respective one of the data points; (b) determining the co-ordinates of a location at which it is desired to determine the value of the function, the location being within the domain and not being coincident with one of the data points; and (c) determining the value of the function at the location from the values of the function at the vertices of the simplex that contains the location.

The invention also provides methods of determining an integral of a function corresponding to the first and second aspects, and provides a method of regularising an array of data points corresponding to the third aspect.

A fourth aspect of the invention provides a method of seismic surveying comprising: propagating an acoustic or electromagnetic field through at least one subsurface layer of the earth; acquiring geophysical data at a plurality of discrete locations; processing the geophysical data according to a method of the first, second or third aspect; and determining one or more parameters relating to physical properties of the at least one subsurface layer using the processed data.

A fifth aspect of the invention provides an apparatus for processing geophysical data and adapted to determine an integral of a function of the geophysical data over an n-dimensional integration domain from the values of the function at a plurality of discrete data points within the integration domain, the apparatus comprising: (a) means for partitioning the integration domain into a plurality of k-dimensional simplexes, where $k \leq n$; (b) means for integrating the function over each simplex; and (c) means for summing the results of step (b).

A sixth aspect of the invention provides an apparatus for processing geophysical data and adapted to determine an integral of a function of the geophysical data over an n-dimensional integration domain from the values of the function at a plurality of discrete data points within the integration domain, the apparatus comprising: (a) means for assigning a weight to each data point; (b) means for multiplying the value of the function at each data point by the weight of the respective data point; and (c) means for summing the results of step (b).

A seventh aspect of the invention provides an apparatus for processing geophysical data and adapted to regularise an array of data points located in an n-dimensional domain, each data point representing the value of a function of the geophysical data at a respective discrete location within the domain, the apparatus comprising: (a) means for partitioning the domain into a plurality of k-dimensional simplexes, where $k \leq n$, with each vertex of a simplex being coincident with a respective one of the data points; (b) means for determining the co-ordinates of a location at which it is desired to determine the value of the function, the location being within the domain and not being coincident with one of the data points; and (c) means for determining the value of the function at the location from the values of the function at the vertices of the simplex that contains the location.

The apparatus may comprise a programmable data processor.

The invention further provides a storage medium containing a program for the data processor of such an apparatus.

The invention further provides a storage medium containing a program for controlling a programmable data processor to carry out a method of the first, second, third or fourth aspect.

BRIEF DESCRIPTION OF THE FIGURES

Preferred embodiments of the present invention will now be described by way of illustrative example with reference to the accompanying figures in which:

FIG. 2($b$) illustrates the result of processing seismic data acquired at the receivers of FIG. 2($a$) using the binning grid of FIG. 2($a$);

FIG. 3($b$) illustrates the difference between the result of processing seismic data acquired at the receivers of FIG. 3($a$) using the binning grid of FIG. 3($a$) and the result of processing the data using a method of the present invention;

FIG. 4($b$) shows the result of processing simulated seismic data using the binning grid of FIG. 4($a$);

FIG. 4($c$) illustrates the result of processing simulated seismic data using a method of the present invention;

FIG. 5($b$) shows the result of processing simulated seismic data using the binning grid of FIG. 5($a$);

FIG. 5($c$) illustrates the result of processing simulated seismic data using a method of the present invention;

FIG. 8($c$) shows estimates of the reflectivity determined using a method of the present invention and three prior art binning techniques;

FIG. 9($b$) shows estimates of the reflectivity determined by a method of the present invention and three prior art binning techniques for the data points of FIG. 9($a$);

FIG. 10($b$) shows estimates of the reflectivity determined by a method of the present invention and three prior art binning techniques for the data points of FIG. 10($a$);

FIG. 11($b$) shows estimates of the reflectivity determined by a method of the present invention and three prior art binning techniques for the data points of FIG. 11($a$);

FIG. 12($b$) shows estimates of the reflectivity determined by a method of the present invention and three prior art binning techniques for the data points of FIG. 12($a$);

DETAILED DESCRIPTION OF THE PREFERRED EMBODIMENTS

Figure 1:
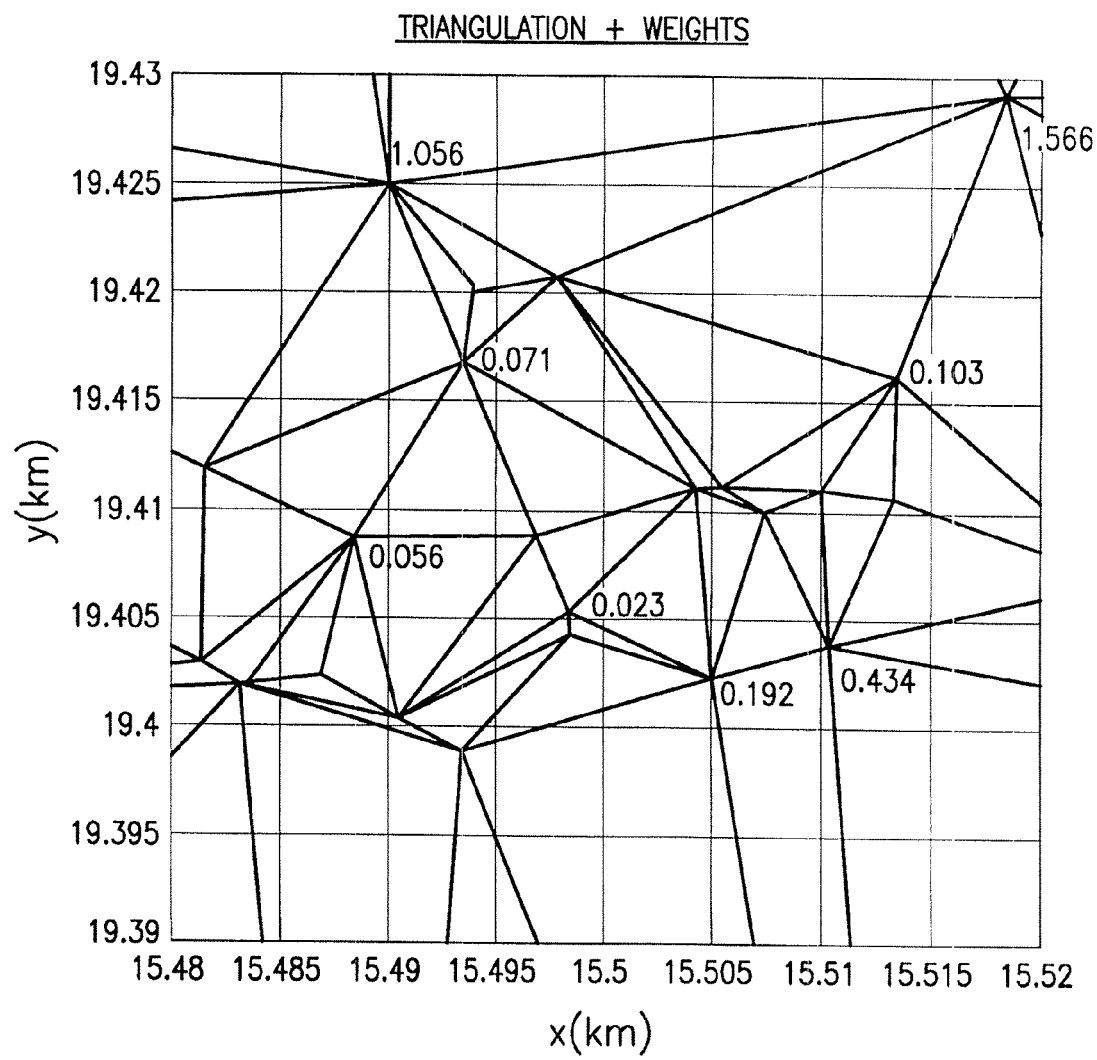
FIG. 1 illustrates tessellation of an integration domain containing irregularly-spaced data points.

In essence, given the positions of the data points the integration domain is tessellated into elements $T_i$ that constitute simplexes (and so the integration domain would be triangulated in the case of a two-dimensional integration domain, tessellated into tetrahedrons in the case of a three-dimensional integration domain, etc). The integration of the function A over the integration domain D then reduces to an integration of the function A over each simplex separately. These contributions then are summed. Thus:

$$\int_D A \, dV = \sum_{i=1}^{n_t} \int_{T_i} A \, dV_{T_i} \tag{5}$$

and the summation over i is from i=1 to i=$n_t$ where $n_t$ is the number of simplex elements created in the tessellation.

The integral of the function A over an element can be computed in several different ways. The simplest way is to approximate A as a constant over an element.

Alternatively one can approximate A by a linear function, and such a function is uniquely determined by its values at the vertices of the element where the volume element $V_{T_i}$ is a k-dimensional simplex (e.g. a triangle (k=2), a tetrahedron (k=3), etc.). It is shown in appendix I below that, for an element T with l (where l=k+1) vertices the following holds:

$$\int_T A \, dV_T = \frac{Vol(T)}{k} \sum_{j=1}^{l} A_j \tag{6}$$

$A_j$ represents the value of the function A at each vertex j of the volume element $V_T$, and the summation is over all vertices (l vertices in total) of the element $V_T$. If there is no topography (that is, when k=n, where n is the dimension of the integration domain) then Vol(T) is the volume of the element. If there is topography then the expression for Vol(T) is slightly more complicated, and is given in appendix II.

Thus the integral of equation (1) has been rewritten as two summations: a summation over j representing summation over the vertices of an element (the summation is from j=1 to j=l), followed by a summation over all the elements:

$$\int_D A \, dV_D = \sum_{i=1}^{n_t} \left( \frac{Vol(T_i)}{k} \sum_{j=1}^{l} A_j \right) \tag{7}$$

It is often more practical to reverse the order of the summation in equation (7) in which case equation (1) may be re-written as:

$$\int_D A \, dV_D = \sum_{i=1}^{n_p} w_i A_i \tag{8}$$

where $w_i$ is called the "weight" of point i and $A_i$ is the value of the function A for the $i^{th}$ data point. The weight of a data point is determined by the areas or volumes of all simplexes that have a vertex at that point.

It is instructive to compare equation (7) with equation (3): the summation of equation (3) that gives equal weights to all data points has been replaced in equation (7) by a summation in which the weights are determined by the way in which the data points are distributed in the integration domain. As will be shown in the examples below, the weight of a certain point is relatively small if many other points surround it, and it is relatively large if it is an isolated point.

If the data points are distributed on a regular grid then each point has the same weight as every other point, and equation (7) becomes identical to equation (3) or equation (2).

Figure 13:
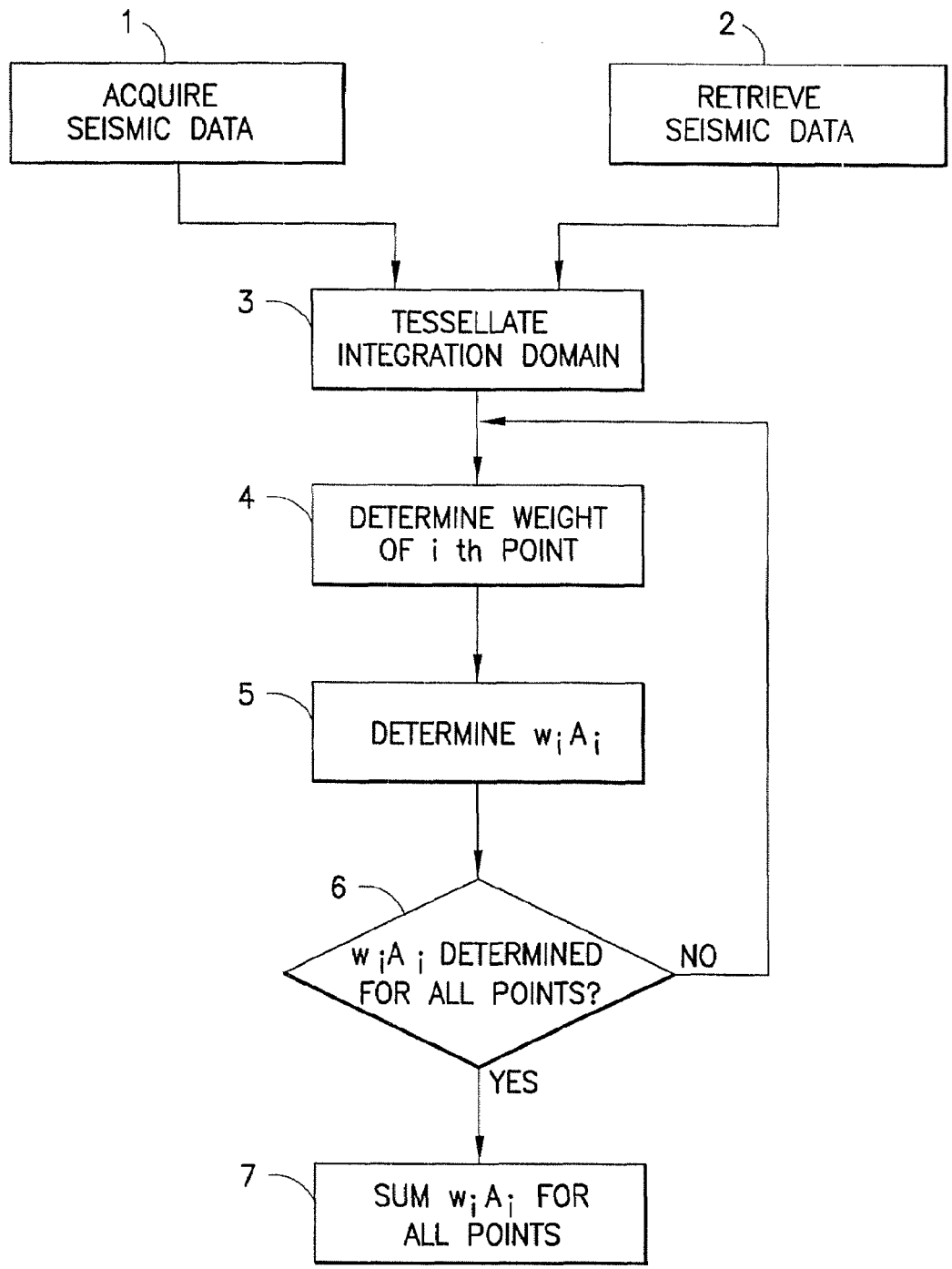
FIG. 13 is a block flow diagram of a method of the present invention.

FIG. 13 is a block schematic flow diagram illustrating the invention applied to a method of processing geophysical data. Initially at step 131 geophysical data such as seismic data or electromagnetic data are acquired. The data are acquired at an array of discrete data points that are not arranged on a regular grid, so that values for the data are known only for the data points. Alternatively, the invention may be applied to pre-existing data, in which case step 131 of acquiring the data is replaced by step 132 of retrieving existing data from storage.

At step 133, the domain in which the data points lie is tessellated. As explained above, the domain is tessellated into simplexes, with each vertex of each simplex being coincident with a respective one of the data points.

At step 134 the weight of a data point, denoted in FIG. 13 as the $i^{th}$ data point, is determined. Step 134 involves determining the weight of each simplex having the $i^{th}$ data point as a vertex.

Steps 133 and 134 are described in more detail with reference to FIG. 1 below.

At step 135 the value of the data at the data point is multiplied by the weight determined at step 134. This gives the product $w_i A_i$ of equation (8) for that data point.

At step 136 it is determined whether steps 134 and 135 have been carried out for all data points.

If this step provides a "no" determination, steps 134 and 135 are repeated for other data points until a "yes" determination is obtained.

Once a "yes" determination is obtained at step 136, the products $w_i A_i$ for each data point are summed at step 137.

The method may be performed in different ways and is not limited to the embodiment of FIG. 13. For example, the weights of every data point may be determined in a single step rather than in separate steps as in FIG. 13. Also, if two or more sets of seismic data are acquired for the same array of data points it is only necessary to tessellate the domain once; once the domain has been tessellated and the weights of the data points determined, the weights can be used in the processing of a subsequent set of data acquired at the same array of data points.

FIG. 1 shows a small number of data points that are irregularly distributed over an integration domain. The data points may represent, for example, midpoints between a seismic receiver and a seismic source and so represent points for which seismic data have been acquired in a seismic survey. In a case where evaluation of the integral of equation (1) was desired, the integrand A would be known at these data points but would not be known elsewhere.

FIG. 1 shows a two-dimensional integration domain and accordingly during the tessellation step the domain is triangulated to define a plurality of triangles as shown in FIG. 1. Each vertex of each triangle is at a respective data point. The triangulation may be carried out using, for example, a Delaunay triangulation as described by S. W. Sloan in "A fast algorithm for constructing Delaunay triangulations in a plane", Adv. Eng. Software, vol. 8, pp 34–55 (1987).

From this triangulation the weights for each point are computed from the areas (in this 2-D case) of the triangles having a vertex at that point (in a higher dimensional case, the weight of a point is determined from the volumes of the simplexes having a vertex at that point). The weight of a data point is therefore determined by the distribution of neighbouring data points—where two data points are said to be neighbouring data points if there is a triangle that has both data points as vertices. If, for a particular data point, the neighbouring data points are distant the triangles with a vertex at that data point will have large areas, and so the data point will have a large weight. Conversely, if, for a particular data point, the neighbouring data points are close the triangles with a vertex at that data point will have small areas, and so the data point will have a low weight. The values of some of the weights are shown in FIG. 1. As expected, points that are close to other points have a relatively low weight, whereas points that are rather isolated have a relatively high weight.

The integral of equation (1) may then be determined according to the invention by using equation (5). To determine the integral, the integral of the function A over each triangle is computed from the seismic data available for each vertex of the triangle. Since the vertices of the triangles are chosen to be coincident with data points, seismic data will always be available for each vertex, and the integral over each triangle may be determined by summing the values of the function A for each vertex of each element, according to the summation over j in equation (7). The integrals over each triangle are then summed.

Alternatively, once the weights for each data point have been determined the integration may be carried out according to the technique of equation (8), in which the value of the seismic data for each data point is multiplied by the weight of that point and the weighted values of the data are then summed.

It should be noted that equations (7) and (8) represent two equivalent methods of obtaining the integral of equation (5). The same result is obtained by using the weights of the data points in equation (8) as by using the volume of the simplex elements in equation (7).

Examples of the method of the invention will now be described with reference to determining the earth's reflectivity for seismic energy.

In post stack (or zero-offset) imaging, the reflectivity of the earth is given by an integral over zero-offset seismic data. In the time domain this integral can be written, per D. Miller et al in "A new slant on seismic imaging: Migration and integral geometry", Geophysics, Vol. 52, pp 943–964. (1987), as:

$$R(x, y, z) = \int_D a(m_1, m_2, x, y, z) u(m_1, m_2, t \quad (9)$$
$$= T_1(m_1, m_2, x, y, z) +$$
$$T_2(m_1, m_2, x, y, z)) d\, m_1 d\, m_2$$

where R is the reflectivity, $(m_1, m_2)$ is the source-receiver midpoint location, a is the theoretical migration amplitude (containing, among other quantities, the geometrical spreading, the background velocity model and the Beylkin determinant) given by the Generalized Radon Transform in this case, $T_1$ is the travel time from the midpoint to the scattering point (x,y,z), $T_2$ is the travel time from the scattering point to the midpoint and u denotes the seismic data. Equation (9) is in the form of equation (1), with the product au of the theoretical migration amplitude and the seismic data representing the function A of equation (1). Equation (9) therefore can be evaluated using a prior art binning technique (equations (2), (3) or (4)) or using a method of the invention.

FIGS. 2(a) to 5(c) illustrate the improved results obtained by a method of the present invention.

Figure 2A:
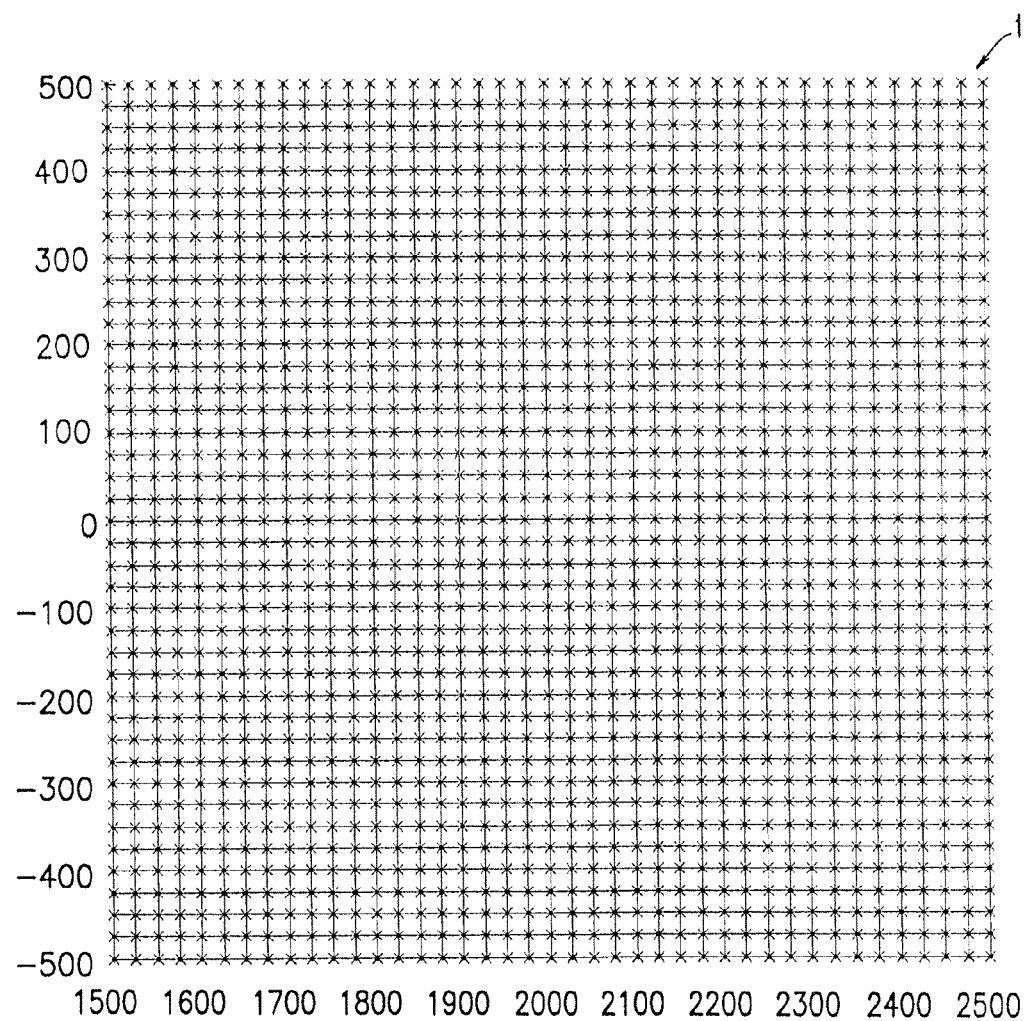
FIG. 2($a$) illustrates a seismic receiver distributions and a binning grid coincident with the receiver positions.

FIG. 2(a) illustrates an array of receiver positions, with each receiver position denoted by an "x". Synthetic seismic data were generated for each receiver location shown in FIG. 2(a) using a simple 3-layer model for the earth's interior. That is, the earth's interior was represented by three layers of different seismic properties, with the upper two layers having a finite thickness and with the third layer extending to infinite depth.

The synthetic seismic data simulated for each receiver location of FIG. 2(a) were then processed to obtain information about the earth's interior. The data were processed in two ways:—firstly, using the prior art binning technique of equation (4) and, secondly, using a method of the invention according to equation (8) above. If the processing is accurate, the original three-layer earth model should be recovered.

FIG. 2(a) also shows the binning grid applied, in solid lines. It will be seen that each vertex of the binning grid 1 is coincident with a receiver location, and that each receiver location is coincident with a vertex of the binning grid. The binning grid is coincident with the receiver grid.

Figure 2B:
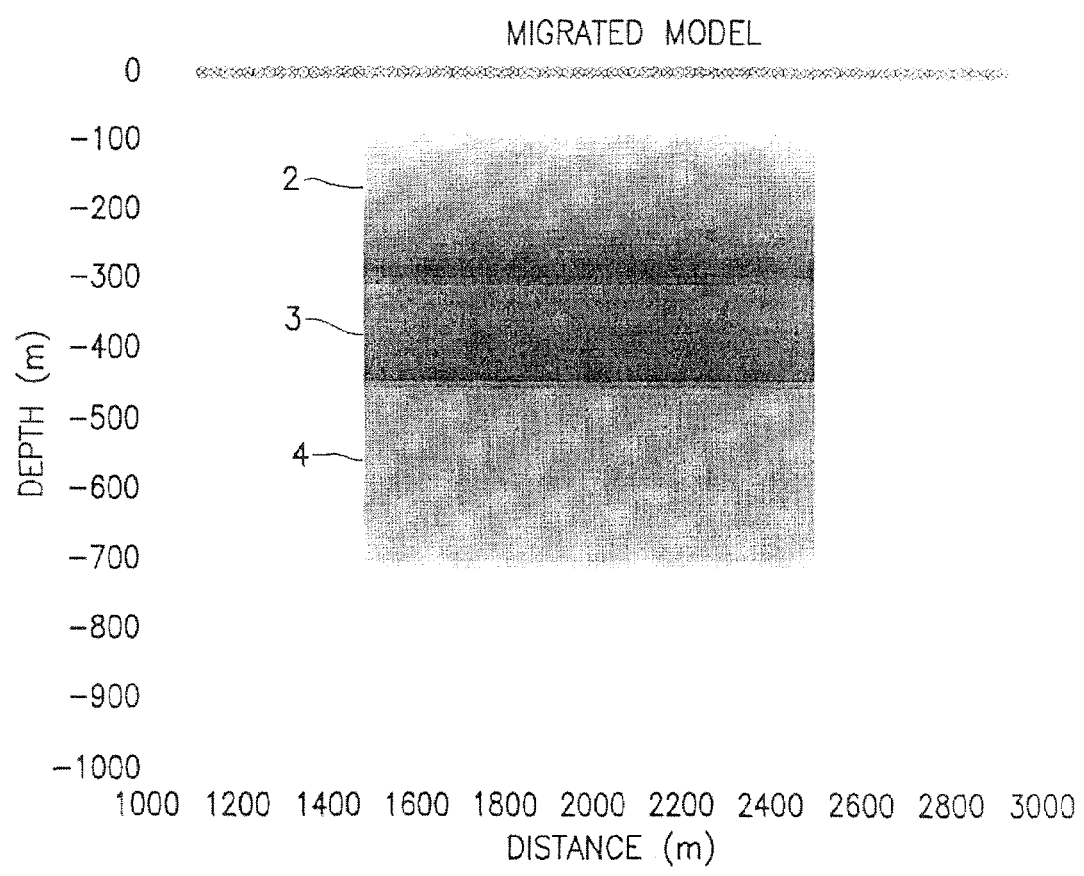

FIG. 2(b) illustrates the results of processing the simulated seismic data. It will be seen that the 3-layer model structure of the earth is recovered well when the data are processed—three layers 2, 3 and 4 can clearly be discerned in FIG. 2(b).

The receiver locations in FIG. 2(a) are arranged in a regular grid, and the size of each "bin" of the binning grid is equal to the distance between adjacent receiver locations. Accordingly, the weights that are allocated to each data point are the same, and the results of the method of the invention are identical to the results of the binning technique. The results of FIG. 2(b) are therefore obtained either using the prior art binning technique of equation (4) or using the method of the invention.

Figure 3A:
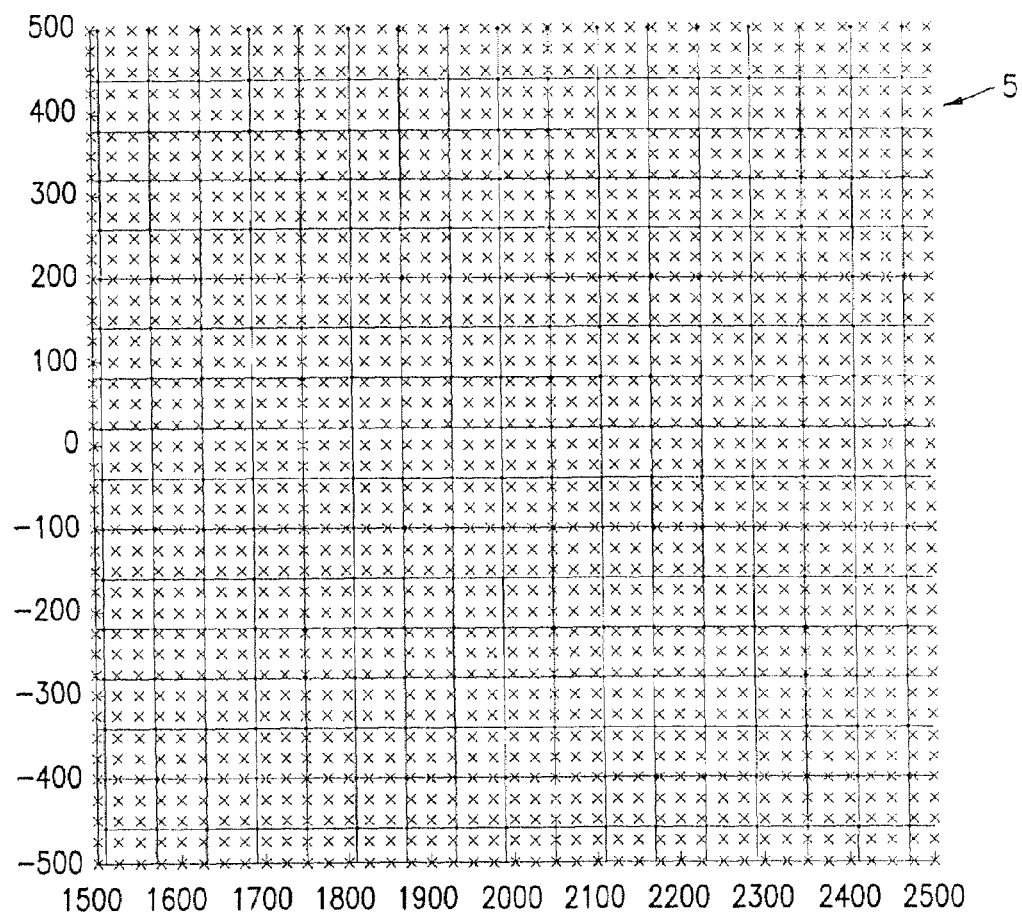
FIG. 3($a$) illustrates a seismic receiver distributions and a binning grid not coincident with the receiver positions.

FIGS. 3(a) and 3(b) illustrate the results of using a different binning grid. FIG. 3(a) again shows the receiver locations, with each receiver location being denoted by an "x". The receiver locations of FIG. 3(a) are the same as the receiver locations of FIG. 2(a), and the seismic data simulated for the receiver locations of FIG. 3(a) using the simple three-layer model of the earth are therefore identical to the seismic data simulated for the receiver locations of FIG.

2(a). However, the binning grid 5 applied in FIG. 3(a) is not the same as the binning grid 1 applied in FIG. 2(a). The binning grid 5 applied in FIG. 3(a) has larger bins, and the vertices of the binning grid are, in general, not coincident with receiver locations. The majority of receivers are therefore not positioned at a vertex of the binning grid. Each bin contains more than one receiver.

FIG. 3(b) shows the difference between, on the one hand, the result of processing the seismic data simulated for the receiver locations of FIG. 3(a) according to the prior art technique of equation (4) using the binning grid 5 of FIG. 3(a) and, of the other hand, the result of processing the simulated seismic data using the method of the invention according to equation (8). As can be seen from FIG. 3(b) there are significant differences between the results acquired by the two processing techniques. In FIG. 3(b) the difference is shown as a function of depth within the earth (vertical scale) and horizontal location (horizontal scale). Dark areas in FIG. 2(b) represent the greatest positive difference, where the result obtained by the invention minus the result obtained by a binning technique is positive, and light areas represent the greatest negative difference.

The results of processing the simulated seismic data according to equation (8) do not depend on the binning grid, so that equation (8) will give the same results when applied to the seismic data simulated for FIG. 2(a) as when applied to the seismic data simulated for FIG. 3(b). The simulated seismic data of FIG. 2(a) are the same as the simulated seismic data of FIG. 3(a), as they were simulated for the same receiver array using the same earth model. The difference between the two results shown in FIG. 3(b) is therefore entirely due to a change in the results obtained using the prior art binning technique.

Furthermore, the difference between the two sets of results in FIG. 3(b) is equivalent to the difference between the results given by the binning grid 5 of FIG. 3(a) and the results given by the binning grid 1 of FIG. 2(a). This indicates that the accuracy of the prior art binning technique is heavily dependent on the choice of the binning grid used. In fact, the error in an integral performed by the prior art binning technique is related to the number of data points in each bin cell (otherwise known as the "fold").

Figure 4A:
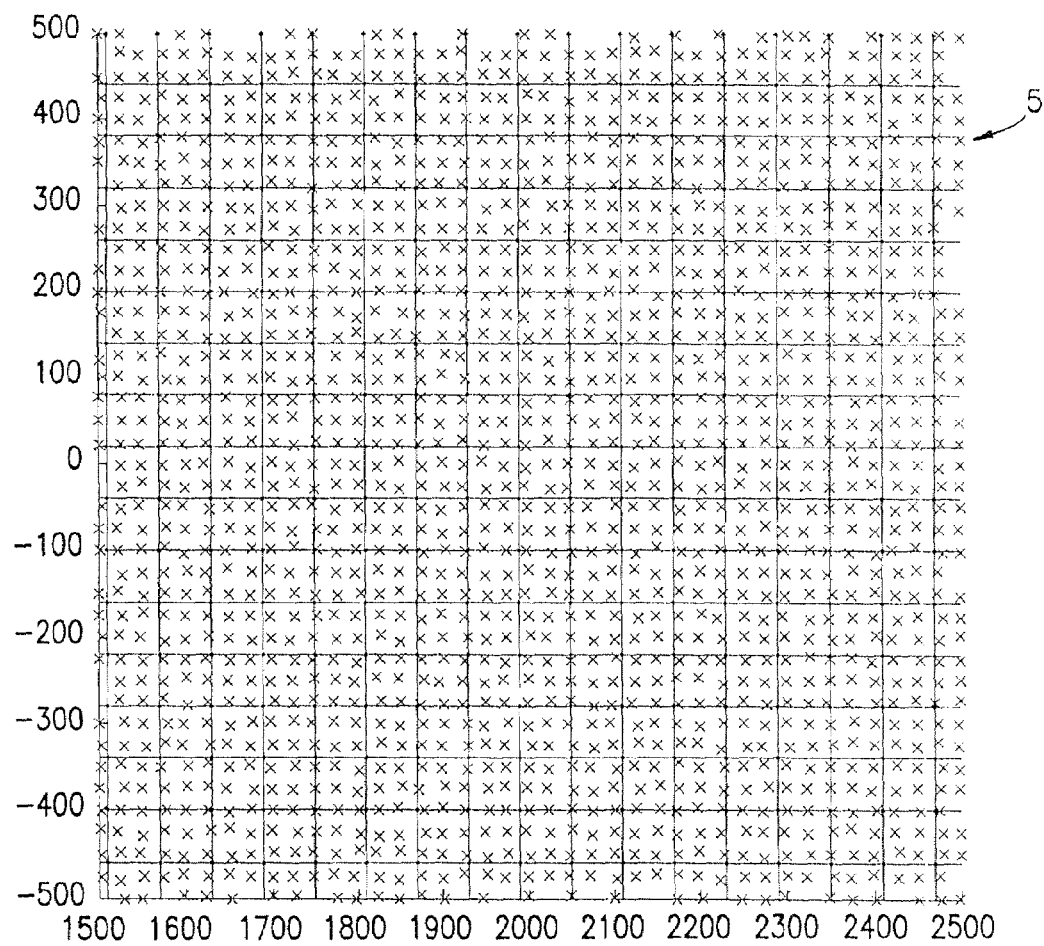
FIG. 4($a$) illustrates an irregular seismic receiver distributions and a binning grid not coincident with the receiver positions.

FIG. 4(a) illustrates a further array of receiver locations, with each receiver location being indicated by an "x". The receivers are arranged generally in a grid, although the receiver arrangement is not exactly regular and some receivers are slightly displaced from the position they would occupy if the grid were entirely regular. Seismic data were simulated for each receiver location of FIG. 4(a), using the same simple 3-layer model for the earth's interior as used in the two previous examples.

The simulated seismic data were then processed according to the prior art binning technique of equation (4) and according to the method of equation (8) of the invention. The processing according to equation (4) was carried out using the binning grid 5 shown in FIG. 4(a), which is the same as the grid 5 used in FIG. 3(a).

Figure 4B:
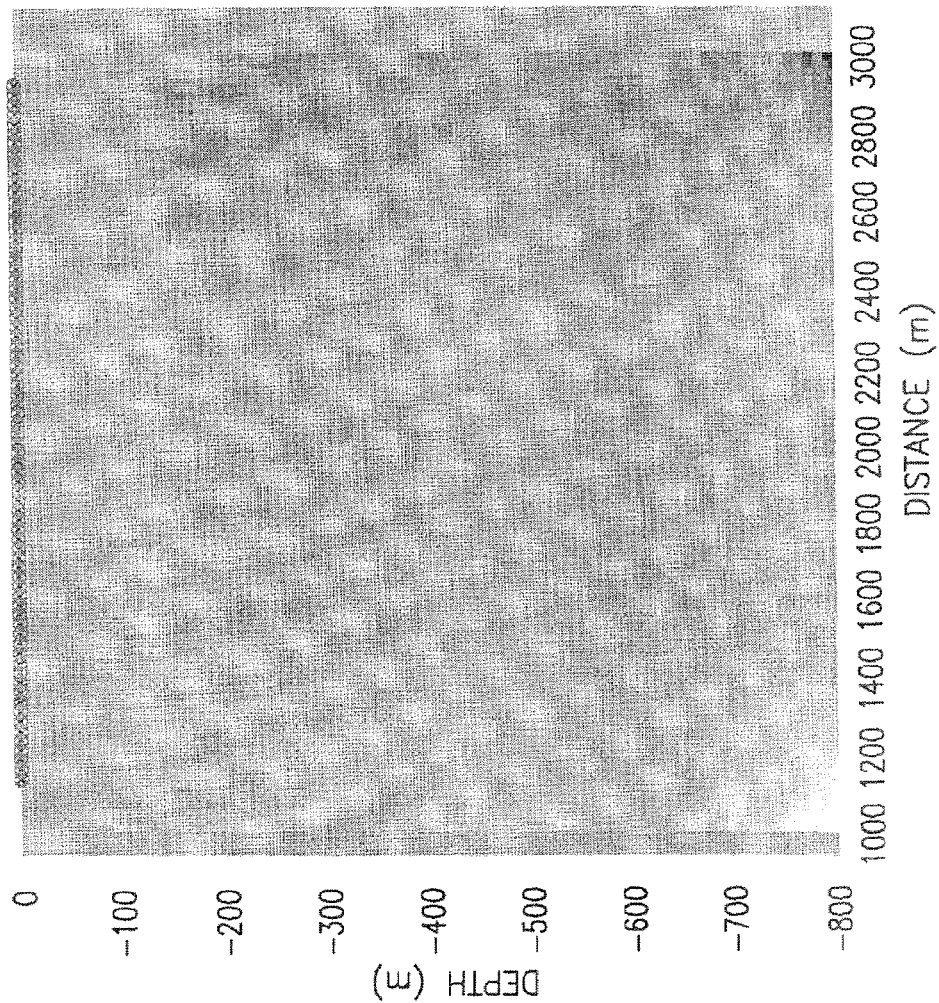
Figure 4C:
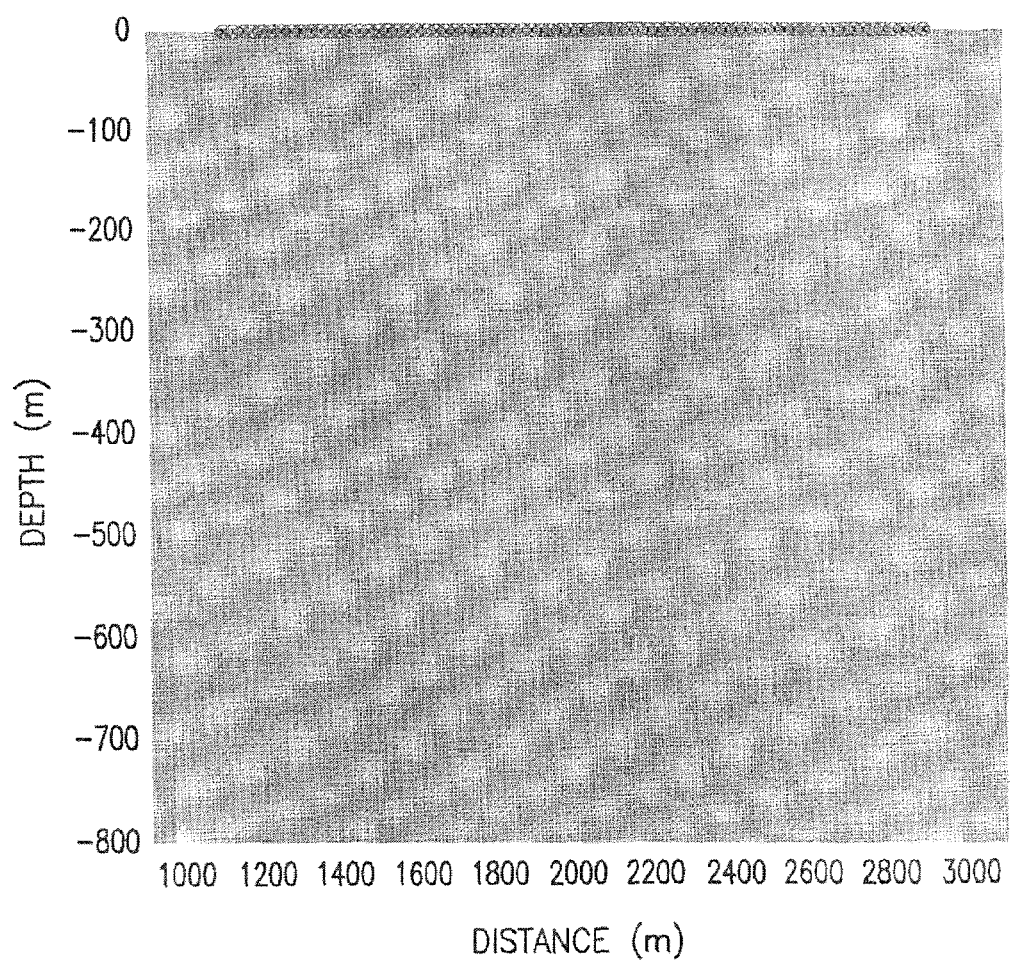

FIG. 4(b) shows the difference between the results obtained using the binning algorithm in this example and the results of FIG. 2(b). FIG. 4(c) shows the difference between the results of processing the seismic data of this example using equation (8) and the results of FIG. 2(b). As in FIG. 3(b), the difference is plotted against depth in the earth and horizontal location, and the magnitude of the difference is represented by shading.

As noted above, the results of FIG. 2(b) are essentially correct, so that the results of FIG. 4(b) represent the error in processing the simulated seismic data for the receiver locations of FIG. 4(a) using the binning technique, and the results of FIG. 4(c) represent the error in processing the seismic data for the receiver location shown in FIG. 4(a) using the method of the present invention. It will be seen from FIG. 4(c) that the error in the results obtained by the method of the present invention is remarkably small. However, the results of FIG. 4(b) show that the prior art binning technique provides much less accurate results for the slightly irregular receiver array of FIG. 4(a).

Figure 5A:
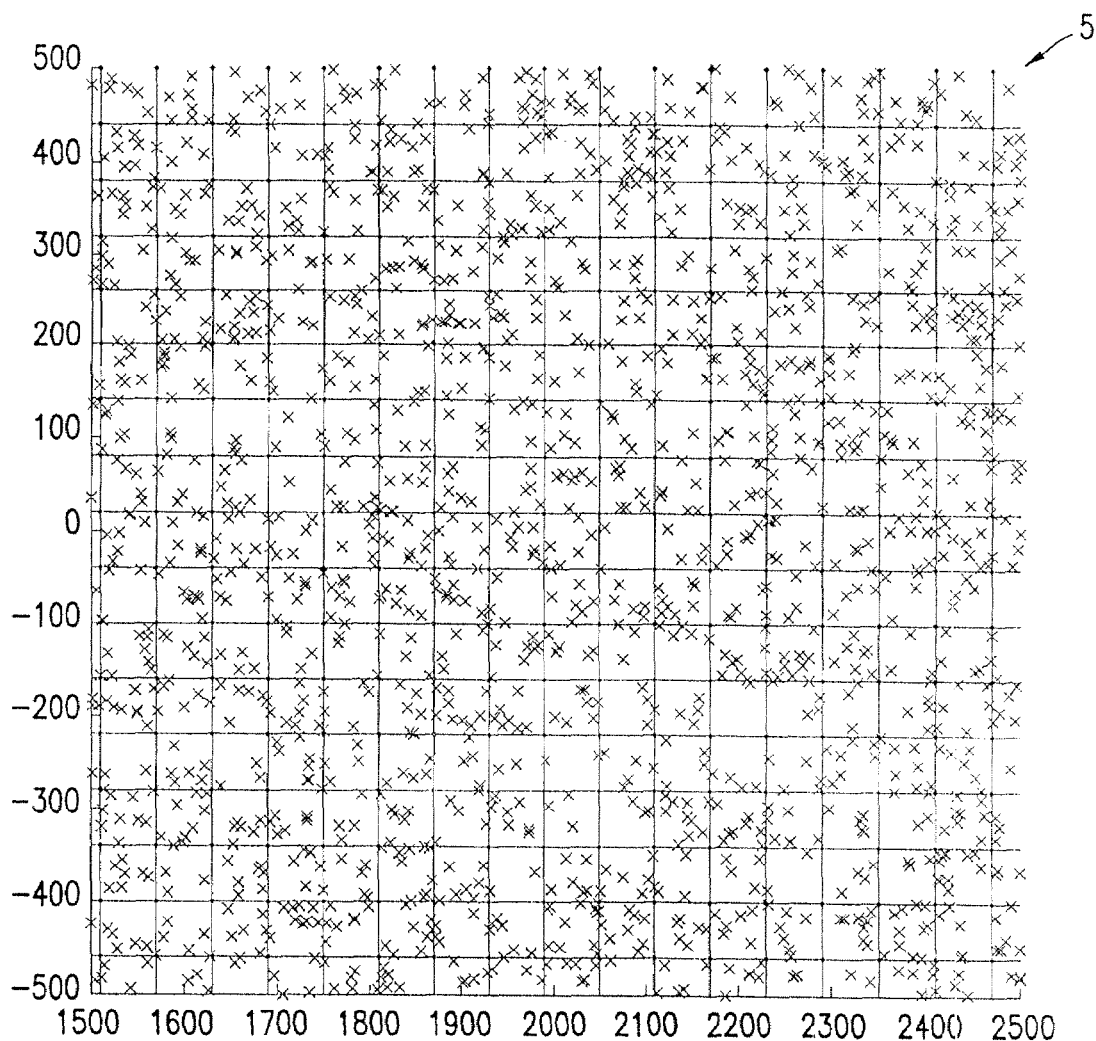
FIG. 5($a$) illustrates a random seismic receiver distribution and a binning grid not coincident with the receiver positions.

FIG. 5(a) shows a further array of receivers. The receiver positions, which are again denoted by an "x", were determined randomly, so that the arrangement of receivers is completely irregular.

Figure 5B:
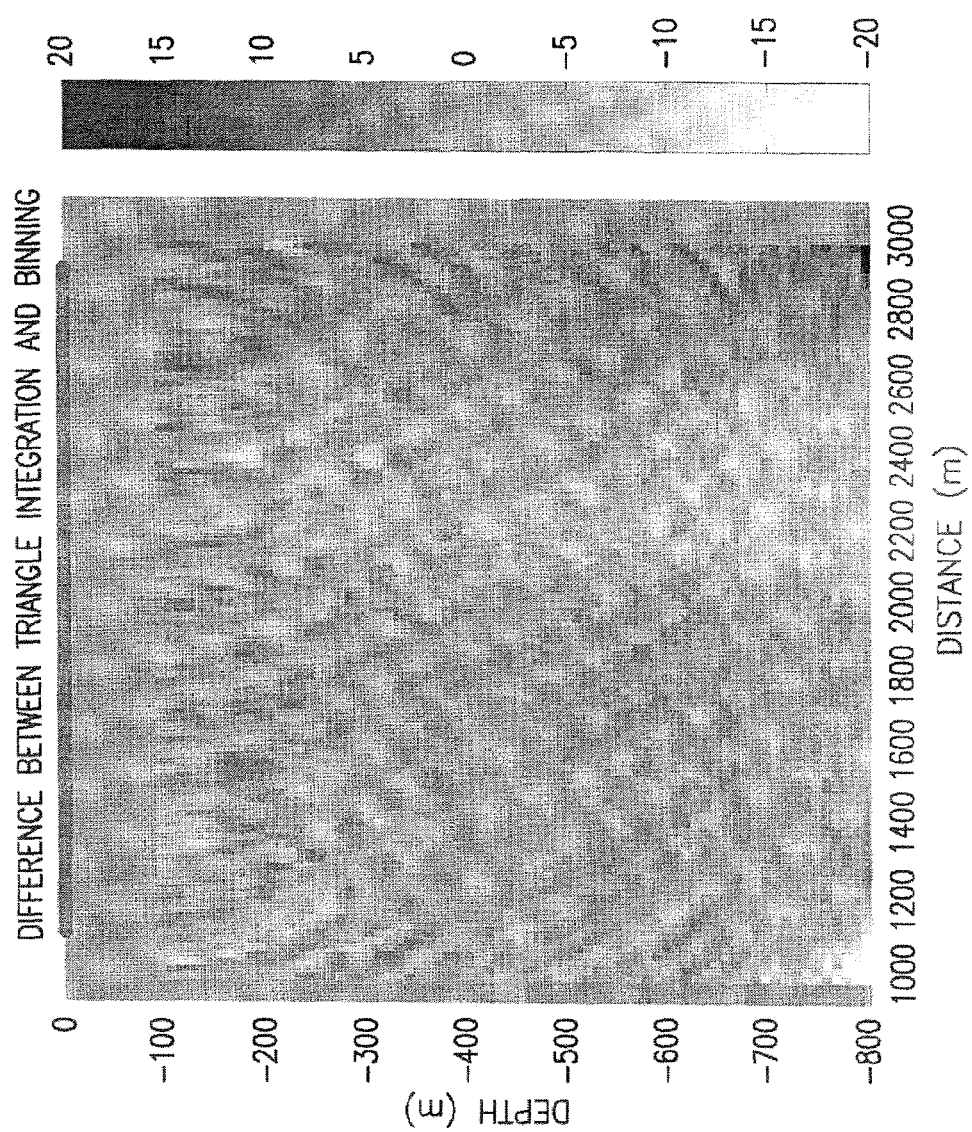
Figure 5C:
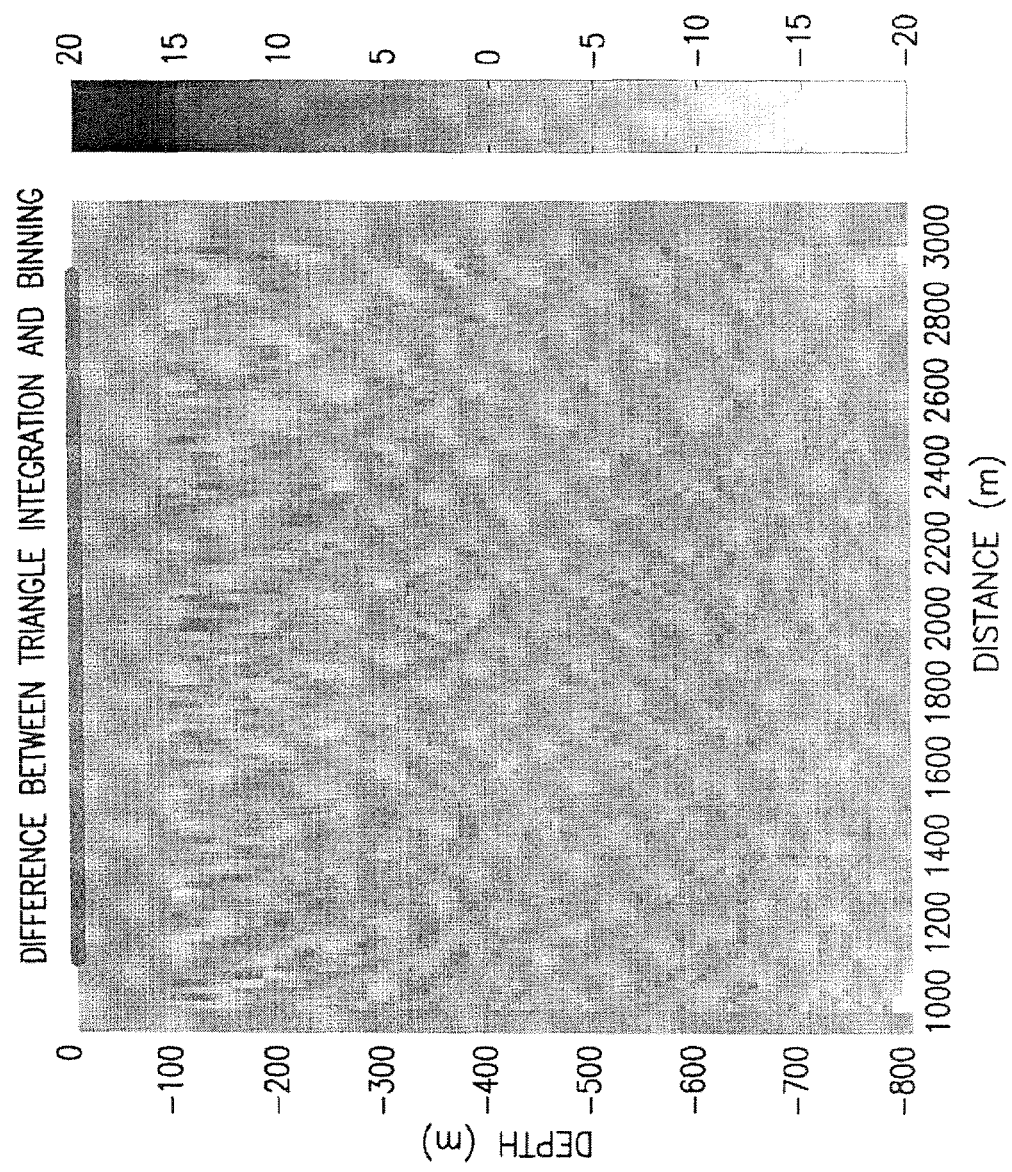

Seismic data were simulated for the receivers shown in FIG. 5(a) using the simple 3-layer earth model used in previous examples. The simulated seismic data were then processed according to the prior art binning technique of equation (4) using the binning grid 5 of the two previous examples, and were also processed according to equation (8). FIG. 5(b) shows the error in the results obtained using the prior art binning technique, and FIG. 5(c) shows the errors in the results obtained using the method of the present invention. As in FIGS. 4(b) and 4(c), the errors in the results of FIGS. 5(b) and 5(c) are defined as being the difference between the results and the results of FIG. 2(b). The results are plotted in the same manner as the results of FIGS. 3(b), 4(b) and 4(c).

It will again be seen that the errors in the method of the present invention (FIG. 5(c)) are significantly lower than the errors in the prior art binning technique. This illustrates that the method of the present invention is much more reliable and can be applied far more broadly than the prior art binning technique. The prior art binning technique can provide good results if the data points are spaced regularly, and if the binning grid is chosen carefully. However if the binning grid is not chosen carefully, or if the data points are not regularly arranged, the prior art binning technique does not give good results. The present invention provides much better results in the case of an irregular array of data points; furthermore, the present invention does not require a binning grid, so the possibility of introducing errors through use of an inappropriate binning grid are eliminated.

The above example has been described with reference to the receiver positions, and this is appropriate for zero-offset imaging. The invention may alternatively be effected using, for example, source-receiver midpoint locations, and this would be appropriate for post-stack migration.

Figure 6:
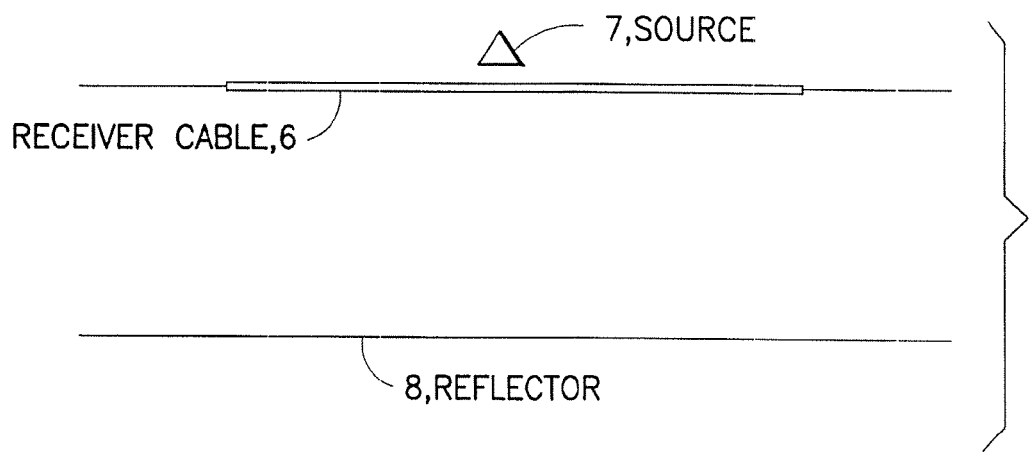
FIG. 6 illustrates a typical marine seismic surveying arrangement.

FIGS. 6 to 12 illustrate a further example of the present invention. This example relates to seismic data acquired using a seismic cable as shown in FIG. 6. In this seismic surveying arrangement, a plurality of seismic receivers (not shown) are mounted on a receiver cable 6. The receiver cable 6 has a typical length of a few kilometers, for example 3 km. The receivers are uniformly spaced along the cable 6, with the spacing between two neighbouring receivers being, for example, 12.5 m or 25 m. A seismic source 7 is also mounted on the seismic cable 6, and is positioned substantially midway along the length of the cable. The cable, with the source, is moved along the earth's surface, and the source 7 is repeatedly "fired" (that is, is repeatedly actuated to emit seismic energy into the earth). The time interval between successive firings of the source is controlled so that the source moves approximately 50 m between one firing position and the next.

The model of the earth's interior assumes that there is a single reflector 8 of seismic energy, which is substantially horizontal.

Seismic data were again simulated for the seismic surveying arrangement of FIG. 6, for the simple earth model having the single flat reflector 8 of FIG. 6.

The data were processed to obtain the reflectivity R by applying a two-dimensional pre-stack Kirchhoff integral according to:

$$R(x,z) = \int a(\theta,\phi,x,z) u(\theta,\phi,t=T_1(\theta,\phi,x,z)+T_2(\theta,\phi,x,z)) d\phi \quad (10)$$

Figure 7:
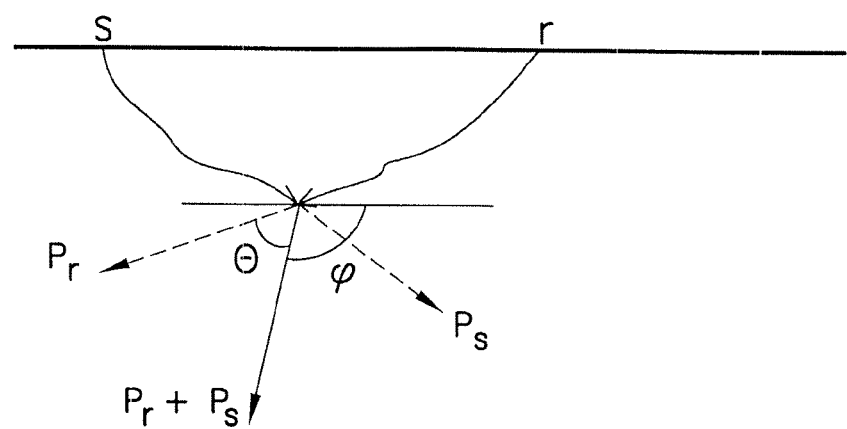
FIG. 7 illustrates scattering angles.

In equation (10), as in equation (9), the function a contains a theoretical amplitude. The variable u represents the seismic data, which are known only at the data points. $\theta,\phi$ are scattering angles, and are defined in FIG. 7. The quantities $p_r$, $p_s$ defined in FIG. 7 are the slowness of the ray from the receiver to the scattering point (x,z), and the slowness of the ray from the source to the scattering point. (The slowness is the gradient of the travel time function). The quantity $p_r+p_s$ defined in FIG. 7 is the sum of $p_r$ and $p_s$. Equation (10) is a two-dimensional equation, but it may be extended to three-dimensions as proposed by S Brandsberg-Dahl et al in "Focussing in Dip and AVA Compensation on Scattering Angle/Azimuth Common Image Gather", Geophysics, Vol. 68, pp 232–254 (2003).

The use of scattering angles as integration variables in equation (10), as opposed to using midpoint and offset as the integration variables as in equation (9) has a number of advantages. There is no need to compute and store the Beylkin determinant, and multi-pathing can be automatically included. Possible disadvantages are that the integration domain becomes more irregular, and that the triangulation changes from one scattering point to the next, thereby increasing the computational effort required to determine the integration. However, the irregularity of the integration domain can be overcome by the use of equation (8), involving the weights of the data points. The problem of the triangulation changing from one scattering point to the next can be overcome by performing triangulation in the midpoint-offset domain—there is a one-to-one relationship between the midpoint-offset domain and the scattering angle domain with a strictly positive Jacobian (assuming there is no multi-pathing) so that triangulation need be performed only once. Thus, the method of equation (7) may also be used, by performing triangulation in the midpoint-offset domain and then performing the remainder of the integration in the scattering angle domain—if the integration is done in this way, there is no additional computational effort required. If there is multi-pathing, it may still be possible to perform a triangulation in the midpoint-offset domain, provided that the resultant triangulation is modified to account for multi-pathing, and this allows equation (7) to be used with negligible additional computational costs.

The synthetic seismic data simulated for the acquisition arrangement of FIG. 6 were then processed according to a prior art binning technique and according to a method of the present invention. The expected result of processing the simulated seismic data is, of course, that the flat reflector earth structure of FIG. 6 should be recovered.

Figure 8A:
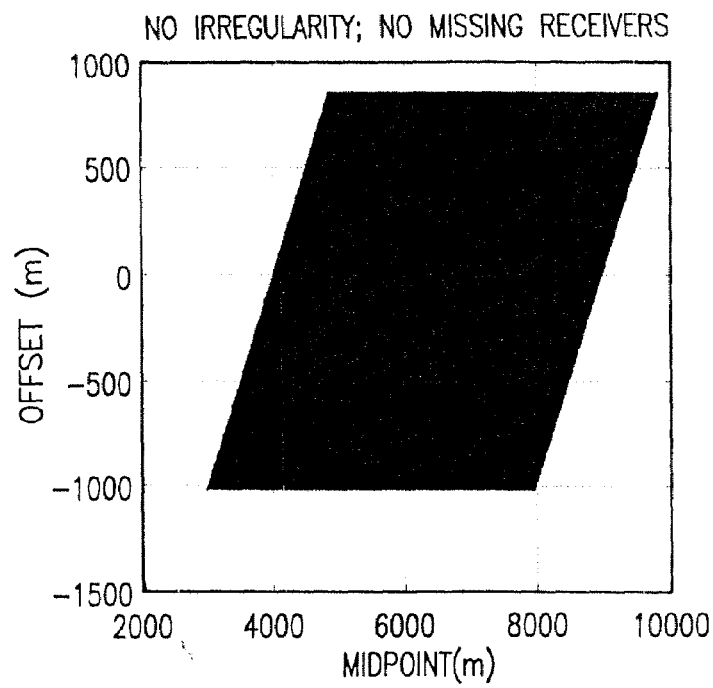
FIGS. 8($a$) and 8($b$) show integration domains in the midpoint/offset domain and the scattering angle domain.
Figure 8B:
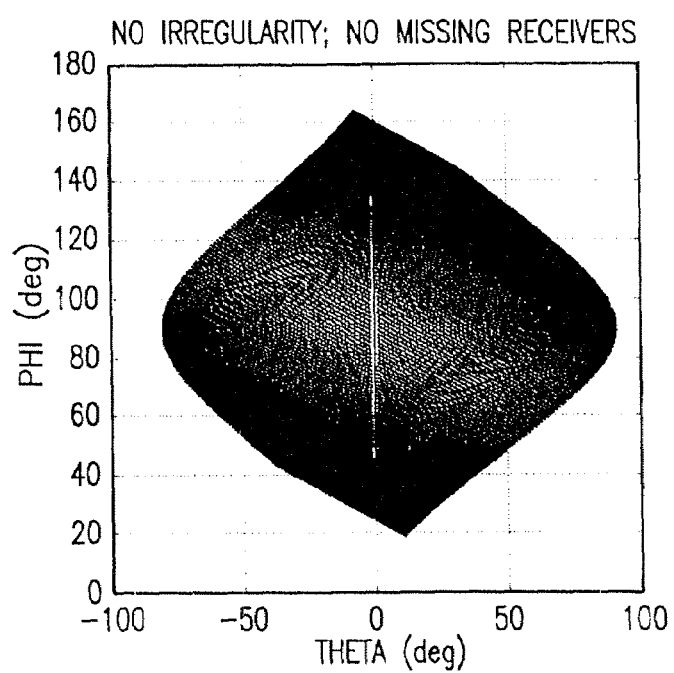
Figure 8C:
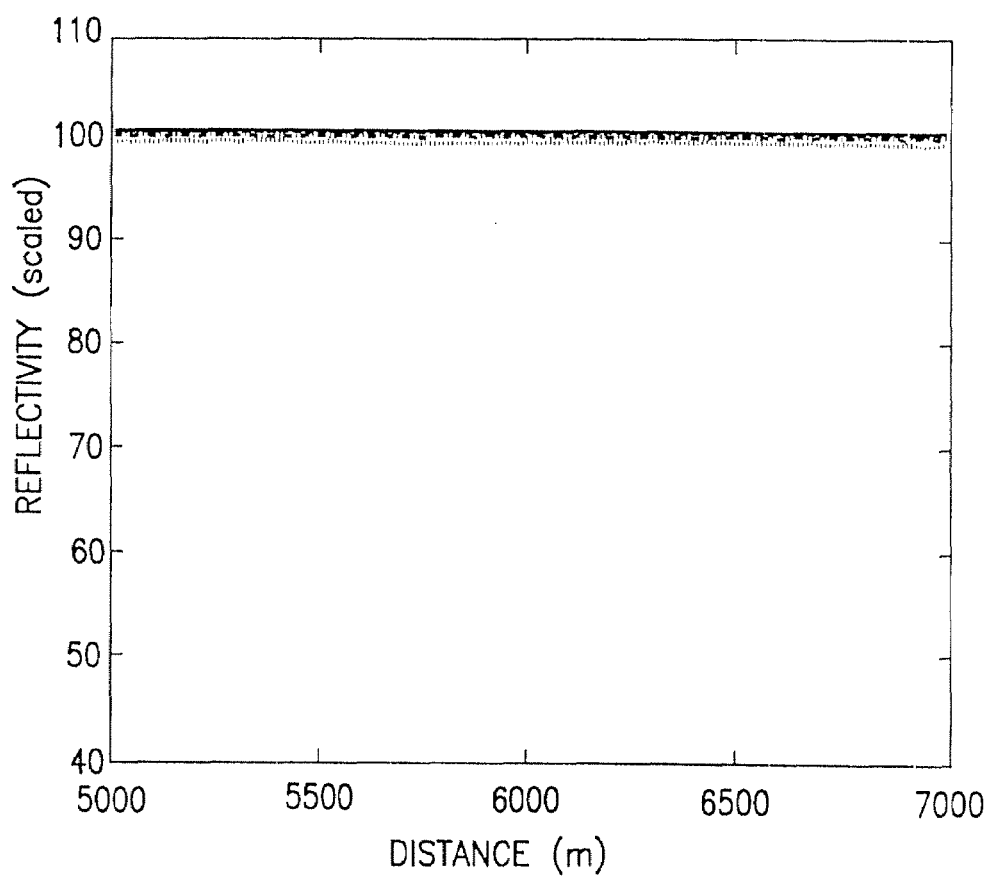

FIG. 8(*c*) shows results obtained using an acquisition geometry that is regular in the midpoint-offset domain. The source spacing was exactly 12.5 m, and the receiver spacing was exactly 25 m. This leads to the regular array of data points for the midpoint offset domain as shown in FIG. 8(*a*). FIG. 8(*b*) shows the corresponding array of data points in the scattering angle domain, and it will be seen that the array of data points is not completely regular in the scattering angle domain.

FIG. 8(*c*) shows the reflectivity obtained by processing the seismic data simulated for the data points of FIG. 8(*a*). The solid line in FIG. 8(*c*) shows the reflectivity obtained using the method of equation (8).

The seismic data were also processed using the prior art binning method of equation (4). This method was performed using three different binning grids, of three degrees (results for this binning grid are shown in FIG. 8(*c*) as a dotted line), six degrees (the results for this binning grid are shown in FIG. 8(*c*) as a dot-dash line), and nine degrees (the results for this binning grid are shown in FIG. 8(*c*) as a dashed line).

It will be seen that the reflectivity for the method of the invention, and the reflectivities obtained by the prior art binning technique for all three binning grids are very close to one another.

Figure 9A:
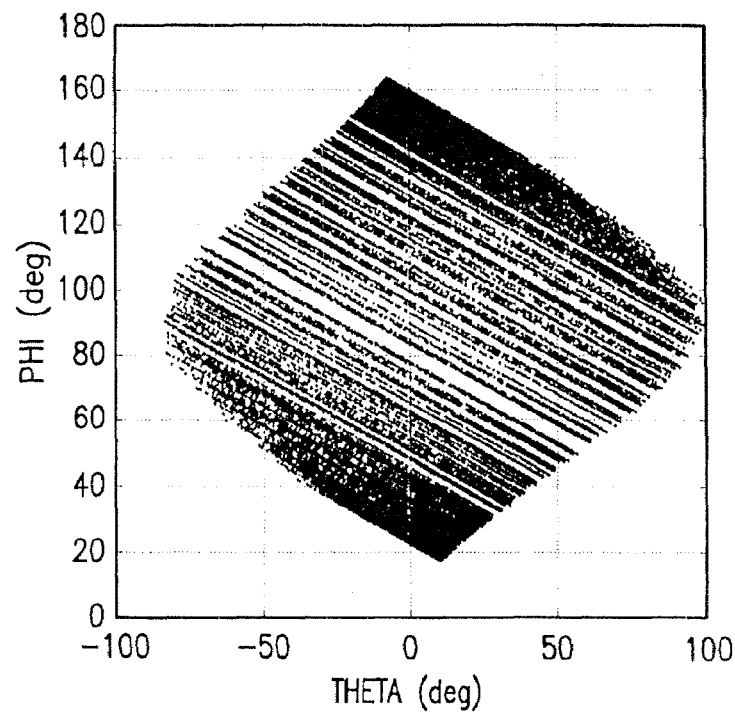
FIG. 9($a$) show an irregular distribution of data points in an integration domain.
Figure 9B:
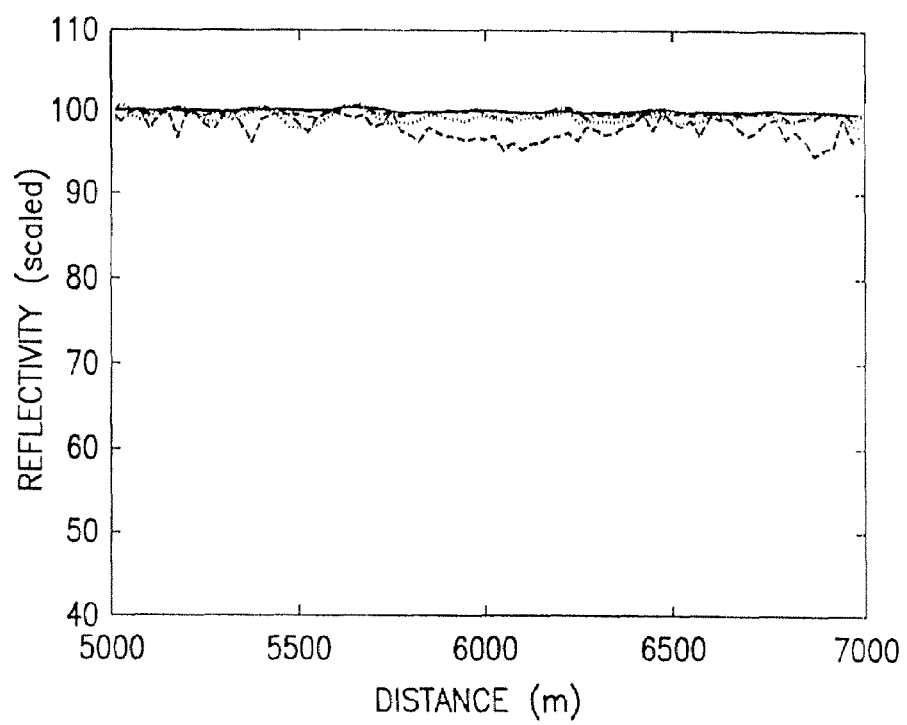

FIG. 9(*a*) shows an array of data points obtained by randomly perturbing the source position and the cable position each by 50 m. The data points are shown in the scattering angle domain in FIG. 9(*a*), and it will be seen that the array is slightly irregular.

FIG. 9(*b*) shows the results of processing seismic data simulated for the data points of FIG. 9(*a*) using the simple earth model of FIG. 6. FIG. 9(*b*) shows the reflectivity obtained by use of the method of equation (8) and by use of the prior art method of equation (4) for the three different binning grids used in the example of FIGS. 8(*a*) to 8(*c*). The solid line in FIG. 9(*b*) represents the results of equation (8), and the dotted line, the dot-dashed line, and the dashed line in FIG. 9(*b*) represent the results of the three prior art binning techniques. The dotted line, dot-dashed line and dashed lines in FIG. 9(*b*) denote the same binning grids as the dotted line, dot-dashed line, and dashed line of FIG. 8(*c*), and this is also the case for the results in FIGS. 10(*b*), 11(*b*) and 12(*b*) below.

FIG. 9(*b*) clearly shows that the irregularities in the array of data points has a marked effect on the results obtained by the prior art binning technique. The prior art binning technique does not obtain a flat reflectivity, for any of the three bin sizes used. However, the reflectivity obtained by equation (8) is still substantially flat, and is much flatter than the results given by the prior art binning techniques. It is clear that the method of equation (8) provides a significantly more accurate result than the prior art binning techniques.

Figure 10A:
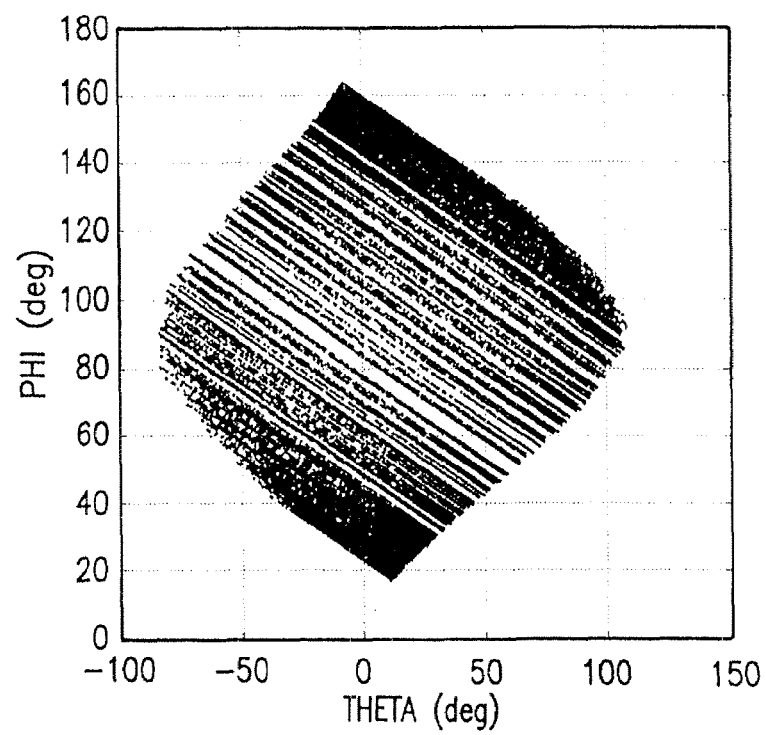
FIG. 10($a$) show an irregular distribution of data points in an integration domain.
Figure 10B:
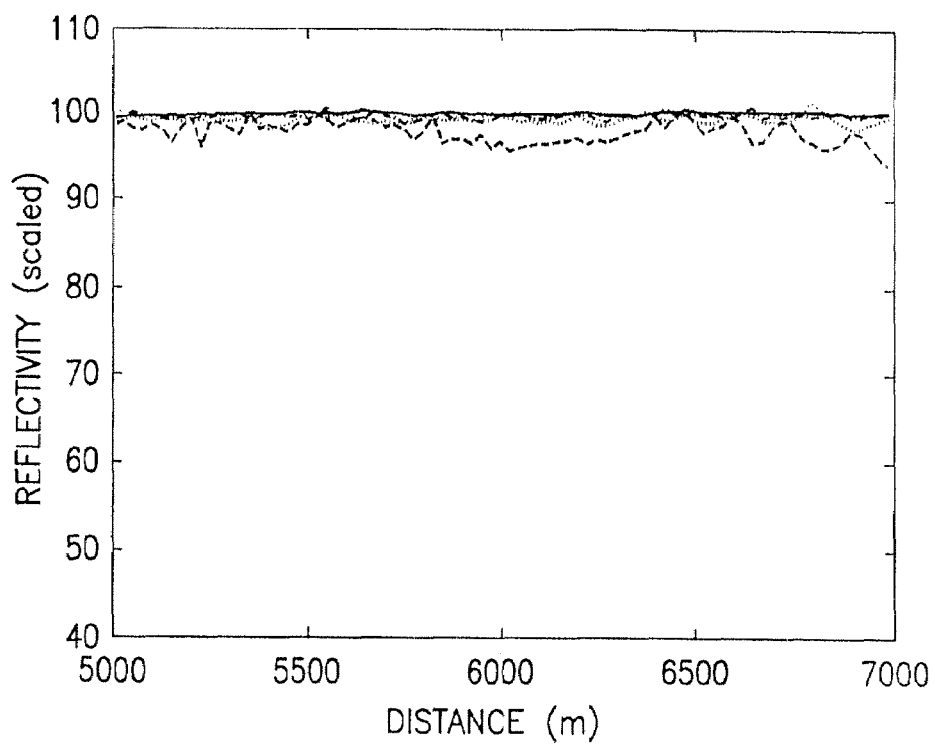

FIG. 10(*a*) shows an array of data points in the scattering angle domain that corresponds generally to the array of FIG. 9 but with 5% of the receivers removed. The results of processing seismic data simulated for the data points of FIG. 10(*a*) using the simple earth model of FIG. 6 are shown in FIG. 10(*b*). FIG. 10(*b*) shows the reflectivity obtained using the method of equation (8) and using the binning technique using the three binning grids of the previous two examples. It will again be seen that the reflectivity results given by the binning techniques have deteriorated slightly compared with the reflectivity results obtained by the binning technique in FIG. 9(*b*). However, the method of equation (8) still yields a reflectivity that is substantially flat, and that is far more accurate than the reflectivity given by any of the binning techniques.

Figure 11A:
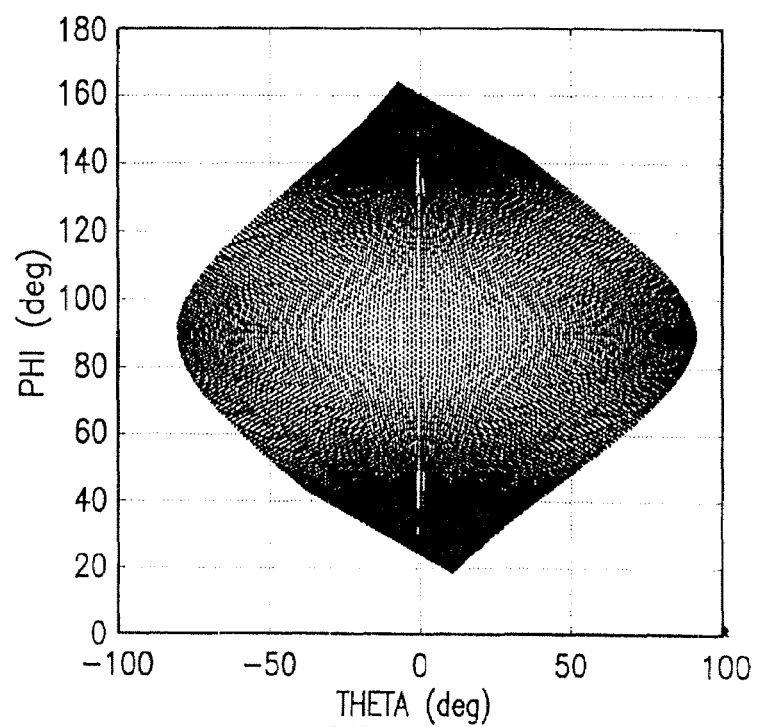
FIG. 11($a$) show an irregular distribution of data points in an integration domain.
Figure 11B:
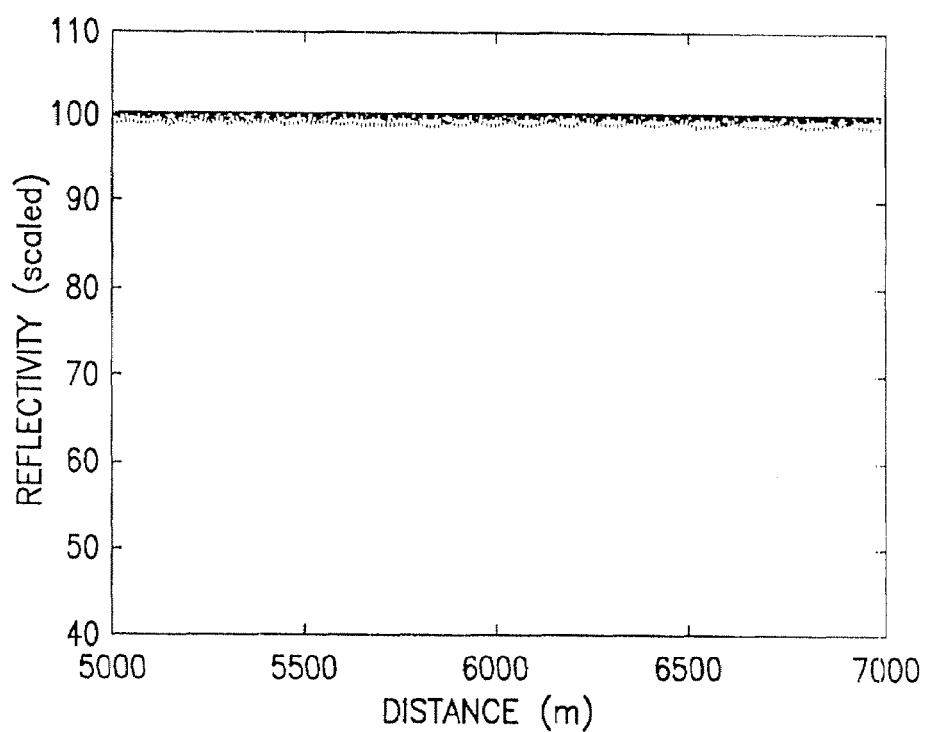

FIG. 11 shows an array of data points in the scattering angle domain, for a receiver spacing of 25 m. The source spacing was still 12.5 m. The corresponding reflectivity results obtained from seismic data simulated for these data points (using the simple earth model of FIG. 6) are shown in FIG. 11(*b*). FIG. 11(*b*) shows the reflectivity obtained using the method of equation (8) and using the binning technique using the three binning grids of the previous two examples. If the results are compared with those of FIG. 8(b), it will be seen that the method of equation (8) still gives a substantially flat reflectivity. The reflectivity given by the binning algorithms is, however, noticeably less flat than the reflectivity given in FIG. 8(b). This shows that increasing the receiver spacing, so that the array of data points is less dense, increases the error in results obtained using a conventional binning technique. The method of the present invention is, however, unaffected.

Figure 12A:
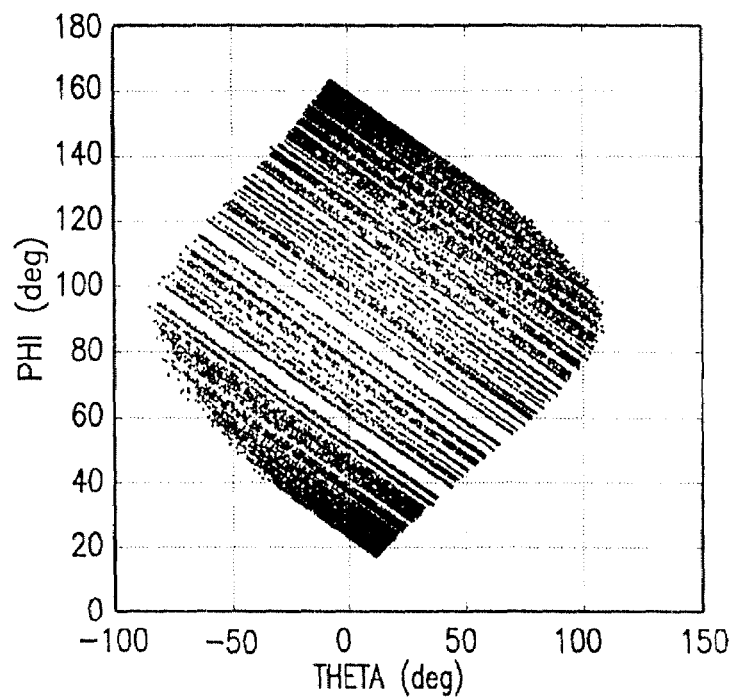
FIG. 12($a$) show an irregular distribution of data points in an integration domain.

FIG. 12(a) shows a further array of data points in the scattering angle domain. This array was again obtained using a nominal receiver spacing of 25 m, although the source and receiver positions have been perturbed and 5% of the receivers have been removed. This yields an irregular array of data points as clearly shown in FIG. 12(a).

Figure 12B:
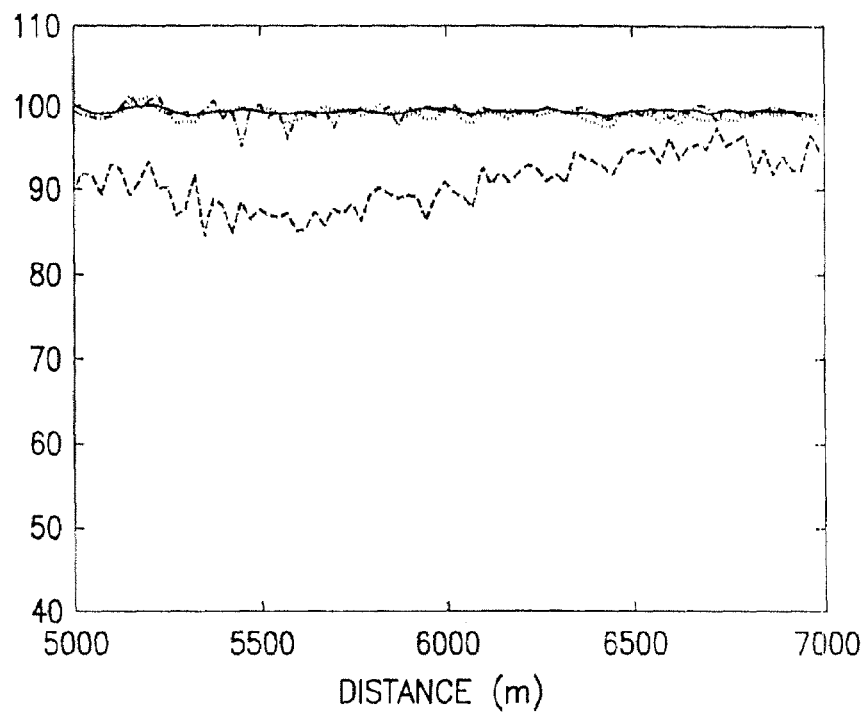

Seismic data were simulated for the data points of FIG. 12(a) using the simple one-layer model of FIG. 6. FIG. 12(b) shows the reflectivity obtained by processing the simulated seismic data, and shows the reflectivity obtained using the method of equation (8) and using the prior art binning technique for the three binning grids of the previous four examples. It will be seen that the results obtained by the binning technique are dependent heavily on the binning grid used—that is, the results obtained using the prior art binning techniques are very unstable. Furthermore, none of the prior art binning techniques produced a reflectivity that is substantially flat. As in the previous figures, the method of the present invention again gives the best results for the reflectivity.

The results of FIGS. 8(a) to 12(b) show clearly that the method of the present invention provides far more reliable results than the prior art binning techniques. The method of the invention provides good results regardless of whether the array of data points is regular or irregular. In contrast, a prior art binning technique will provide good results only for a regular array of data points, and only if the binning grid is chosen correctly. In the case of an irregular array of data points, the results given by a prior art binning technique depend heavily on the binning grid used.

Integrals of the form of equation (1) are also used in electromagnetic imaging of the earth. Electromagnetic imaging has important applications in determining the earth's structure in the vicinity of the borehole (see, for example, Y. Chen and M. Oristaglio in "A modelling study of borehole radar for oilfield applications", Geophysics, 67, 1486–1494 (2002).

In electromagnetic imaging the acquired data are the values of the electric and magnetic fields and the goal is to determine the electrical conductivity and permittivity of the earth. For example the electric conductivity is given (see equation (30) of T. Wang and M. Oristaglio in "GPR imaging using the generalised Radon Transform", Geophysics Vol. 65, 1553–1559 (2000)) as:

$$\delta\sigma(x) = \int f(E, B) d\alpha d\beta \quad (11)$$

where $\delta\sigma(x)$ is the electric conductivity at a point x, f is a known function, E and B are the electric and magnetic fields respectively, and $\alpha$ and $\beta$ are angles. In practice, the values of E and B will be known only at a finite number of points. If these points are distributed on an irregular grid, then equation (11) may be determined using a method of the invention. For example equation (11) may be re-written along the lines of equation (7) or equation (8), and the same algorithms as in the previous examples may be applied.

The integration methods described so far use the exact source and receiver locations.

They also assume an appropriate background model for, for example, the propagation velocity of seismic energy through the earth. In practice there is an uncertainty in all these parameters—for example, the positions of the seismic sources and seismic receivers will not be precisely know. If it is assumed that these uncertainties can be quantified using a statistical distribution, such as for example a Gaussian distribution, then it is also possible to estimate the uncertainty in the integral itself using the methods of the invention described above.

Thus, for example, equation (10) can be rewritten as:

$$<R(x, z)> = \int_C <a(x, z, \theta, \varphi)> u(\theta, \varphi, t \quad (12)$$
$$= <T_1(\theta, \varphi, x, z) + T_2(\theta, \varphi, x, z)> d\theta d\varphi$$

where <q> denotes the value of the parameter q with a certain statistical distribution.

Note that the amplitude a and travel times $T_1$ and $T_2$ implicitly depend on the source and receiver positions and the velocity model.

The value of <R> can be determined by finding a range of values for the source and receiver positions and for the velocity model, sampled according to their distributions.

This gives a range of values for the amplitude a and travel times $T_1$ and $T_2$, which in turn, after computation of the integral of equation (12), gives a range of values for R. A distribution for R can be obtained from this range of value for R, and this distribution provides an estimate of the uncertainty in R.

The invention has been described above with reference to processing geophysical data, but the invention has further applications. One application is in regularising a set of data points.

As explained above, the data points obtained in an actual seismic survey are often not arranged on a regular grid. In this case, in a conventional processing method the binning step is frequently preceded by a regularisation step. In the regularisation step values for the integrand A for an array of estimated data points that are on a regular grid are obtained from the values known for the irregularly-distributed data points, by interpolation.

Figure 14:
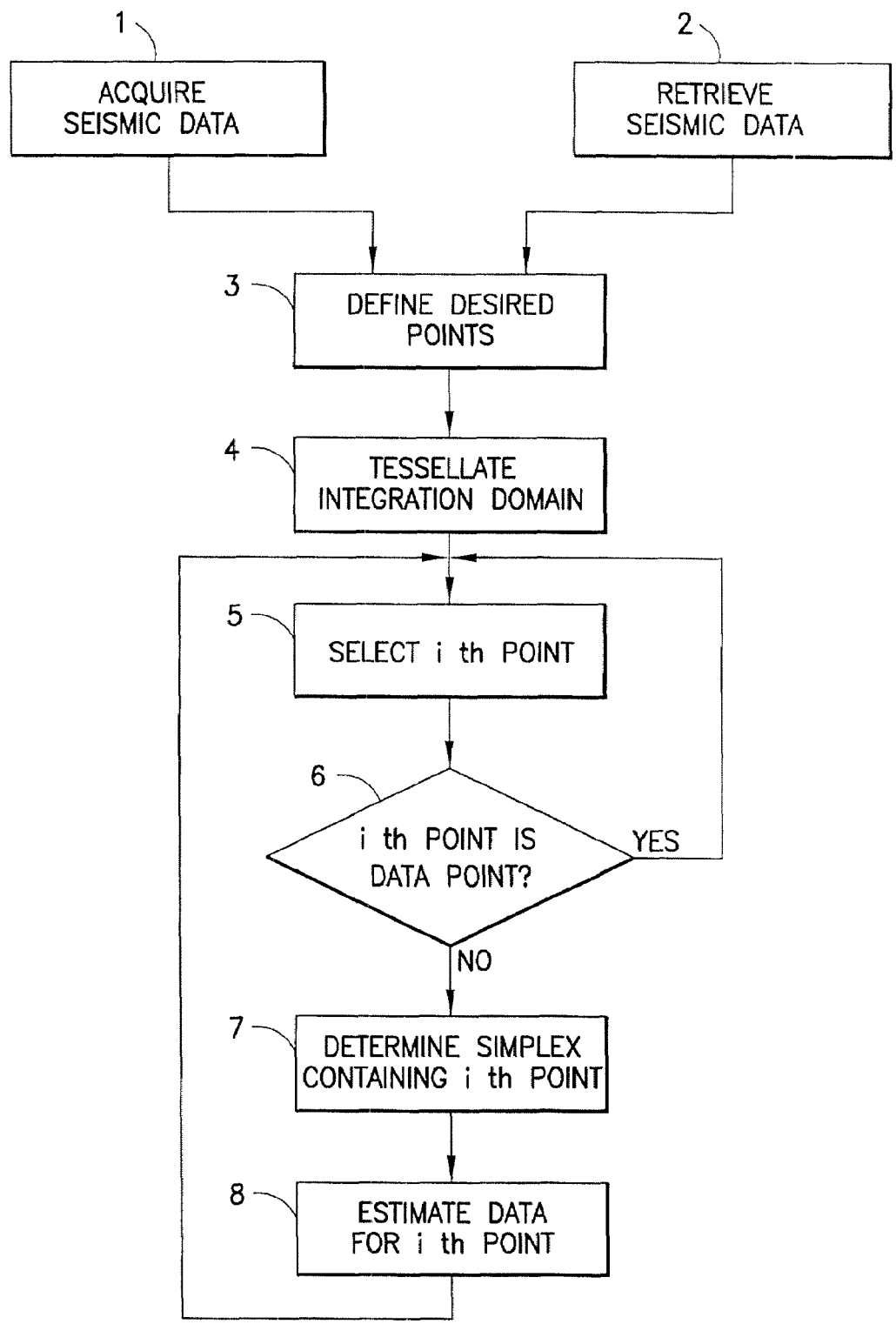
FIG. 14 is a block flow diagram of a regularisation method of the present invention.

The present invention may be used to perform the regularisation step, for example in the processing of geophysical data, which may be performed very efficiently once the integration domain has been tessellated. This is illustrated in FIG. 14, which is a block schematic diagram of a method of using the techniques of the invention to performing a regularisation step. Initially at step 141 geophysical data such as seismic data or electromagnetic data are acquired for an array of data points that are not arranged on a regular grid. Alternatively, the invention may be applied to pre-existing data, in which case step 141 of acquiring the data is replaced by step 142 of retrieving existing data from storage.

At step 143, one or more points at which it is desired to estimate values for the seismic data are defined. Step 143 may consist of, for example, defining an array of points that lie on a regular grid.

At step 144 the domain in which the data points lie is tessellated. The order in which steps 143 and 144 are performed is not important, and step 144 may alternatively be performed before, or at the same time as, step 143.

At step 145 one of the points defined at step 143 is selected, and at step 146 it is determined whether this point is co-incident with a data point. If the selected point is not coincident with a data point, the simplex within which the selected data point lies is determined at step 147. At step 148 the value of the data at the selected point is estimated from values of the data at the vertices of the simplex identified in step 148, for example using linear interpolation.

If step 146 determines that the selected point is coincident with one of the data points, the value of the data for that data point is taken to be the value of the data for the selected point without any further calculation being required (this step is omitted from FIG. 14).

Figure 15:
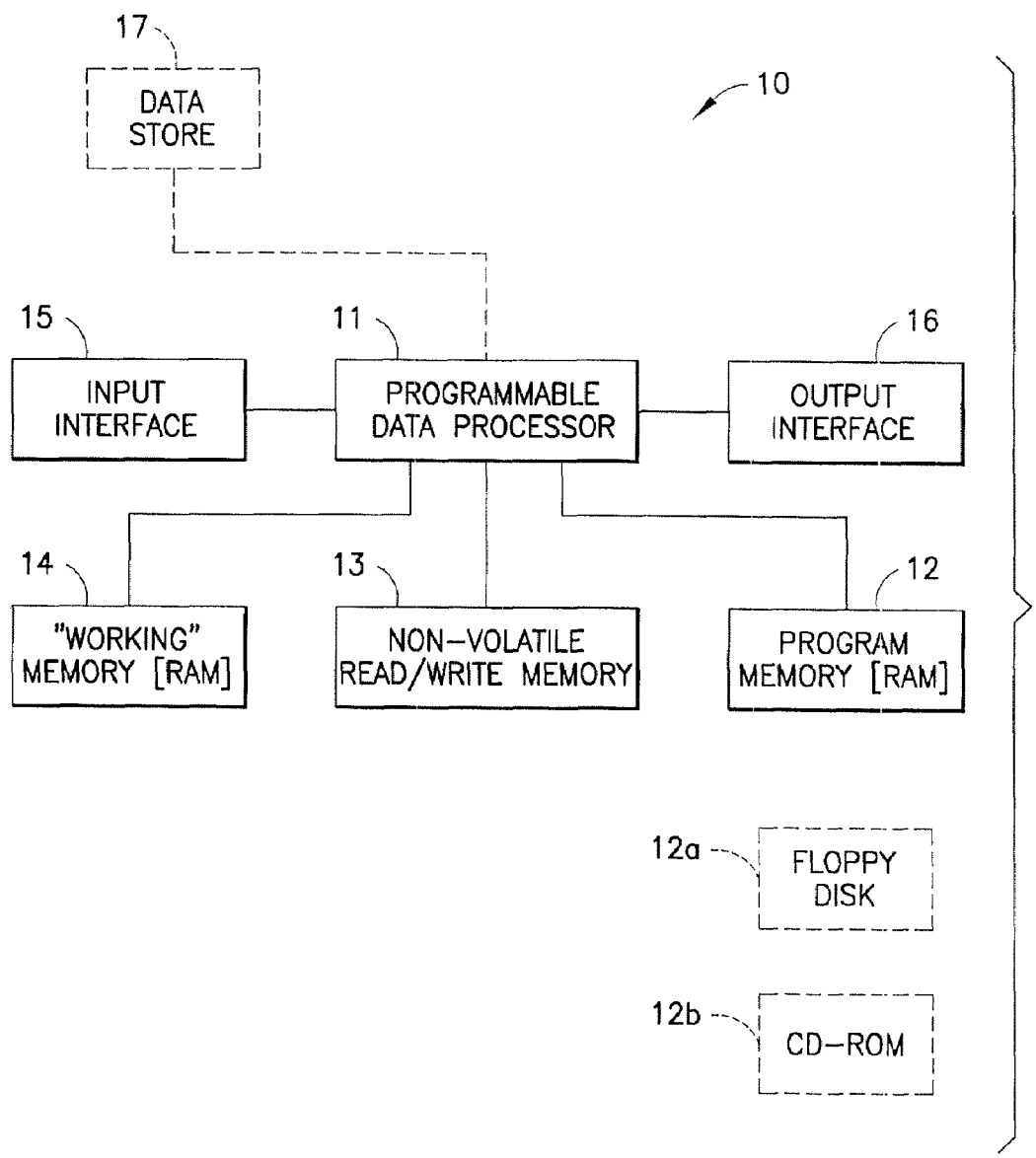
FIG. 15 is a block schematic diagram of an apparatus according to the invention.

FIG. 15 is a schematic block diagram of a programmable apparatus 10 according to the present invention. The apparatus comprises a programmable data process 11 with a programme memory 12, for instance in the form of a read-only memory (ROM), storing a programme for controlling the data processor 11 to perform any of the processing methods described above. The apparatus further comprises non-volatile read/write memory 13 for storing, for example, any data which must be retained in the absence of power supply. A "working" or scratch pad memory for the data processor is provided by a random access memory (RAM) 14. An input interface 15 is provided, for instance for receiving commands and data. An output interface 16 is provided, for instance for displaying information relating to the progress and result of the method. Data for processing may be supplied via the input interface 14, or may alternatively be retrieved from a machine-readable data store 17.

The programme for operating the system and for performing any of the methods described hereinbefore is stored in the programme memory 12, which may be embodied as a semi-conductor memory, for instance of the well-known ROM type. However, the programme may be stored in any other suitable storage medium, such as magnetic data carrier 12a, such as a "floppy disk" or CD-ROM 12b.

Appendix I

In this appendix we provide proof equation (6) for two and three dimensions. The generalization to higher dimensions follows readily.

Let D be an area in the two dimensional plane. If the area of D is equal to A then by definition $$A = \int_D dx dy.$$

We compute the integral of a linear function over D:

$$\int (c_0 + c_1 x + c_2 y) dx dy = \tag{A1}$$

$$c_0 \int_D dx dy + c_1 \int_D x dx dy + c_2 \int_D y dx dy =$$

$$A\left(c_0 + c_1 \frac{\int_D x dx dy}{\int_D dx dy} + c_2 \frac{\int_D y dx dy}{\int_D dx dy}\right)$$

Now

-continued $$\left(\frac{\int_D x dx dy}{\int_D dx dy}, \frac{\int_D y dx dy}{\int_D dx dy}\right)$$

is the centre of gravity of D. Therefore if D is a triangle with corners $(x_1, y_1), (x_2, y_2), (x_3, y_3)$ then its centre of gravity is $$\frac{1}{3}(x_1 + x_2 + x_3, y_1 + y_2 + y_3),$$

so that:

$$\int_D (c_0 + c_1 x + c_2 y) dx dy = A\left(c_0 + c_1 \frac{x_1 + x_2 + x_3}{3} + c_2 \frac{y_1 + y_2 + y_3}{3}\right) \tag{A2}$$

Or, in words: the integral of a linear function over a triangle is equal to the average of the value of the function at the three vertices of the triangle.

This result can easily be generalized to higher dimensions. For example, in 3 dimensions, when D is a tetrahedron with volume V and coordinates $(x_i, y_i, z_i)$ (i=1,2,3,4) we have:

$$\int_D (c_0 + c_1 x + c_2 y + c_3 z) dx dy dz = \frac{1}{4} V(a_1 + a_2 + a_3 + a_4) \tag{A3}$$

where the $a_i$ are the values of the linear function at the vertices of the tetrahedron.

Appendix II—The Volume of a k-dimensional Tetrahedron in n-dimensional Space

Consider a k-dimensional tetrahedron T defined by the k+1 n-dimensional points $0, a_1, \ldots, a_k$. We will show that the volume of this tetrahedron is given by:

$$Vol(T) = \frac{1}{k!} \begin{vmatrix} (a_1, a_1) & (a_1, a_2) & \cdots & (a_1, a_k) \\ (a_2, a_1) & \ddots & & \vdots \\ \vdots & & & \\ (a_k, a_1) & \cdots & & (a_k, a_k) \end{vmatrix}^{1/2} \tag{A4}$$

where ( . . . ) denotes the n-dimensional inner product.

Equation (A4) can be interpreted as:

Volume=Base×Height

We prove this using the induction principle. Consider a k-dimensional parallelepiped in n dimensions spanned by the vectors $a_1, \ldots, a_k$. The vectors $a_1, \ldots, a_{k-1}$ span the 'base' of this parallelepiped. We write:

$$a_k = a_b + a_h$$

where $a_b = \lambda_1 a_1 + \ldots \lambda_{k-1} a_{k-1}$ and $a_h$ is perpendicular to all $a_1, \ldots, a_{k-1}$. $|a_h|$ is the height of the parallelepiped. We now have $$\begin{vmatrix} (a_1, a_1) & (a_1, a_2) & \cdots & (a_1, a_k) \\ (a_2, a_1) & \ddots & & \vdots \\ \vdots & & & \\ (a_k, a_1) & \cdots & & (a_k, a_k) \end{vmatrix} =$$

$$\begin{vmatrix} (a_1, a_1) & (a_1, a_2) & \cdots & (a_1, a_k) \\ (a_2, a_1) & \ddots & & \vdots \\ \vdots & & & \\ (a_k, a_1) & \cdots & & (a_b, a_k) + (a_k, a_k) \end{vmatrix} =$$

$$(a_h, a_h) \begin{vmatrix} (a_1, a_1) & (a_1, a_2) & \cdots & (a_1, a_k) \\ (a_2, a_1) & \ddots & & \vdots \\ \vdots & & \ddots & \\ (a_{k-1}, a_1) & \cdots & & (a_{k-1}, a_k) \end{vmatrix}.$$

Upon taking the square root we find equation (A4). Since the parallelepiped consists of k! equal tetrahedrons the volume of the tetrahedron follows.

The invention claimed is:

1. A method for processing geophysical data comprising:
    (a) determining an integral of a function of the geophysical data over an n-dimensional integration domain from the values of the function at a plurality of data points within the integration domains;
    (b) partitioning the integration domain into a plurality of k-dimensional simplexes, where k<=n, wherein each vertex of a simplex is coincident with one of the data points;
    (c) integrating the function over each simplex;
    (d) summing the results of step (c)
    (e) storing the sum into a computer readable medium; and
    (f) using the sum for geophysical exploration.

2. A method as claimed in claim 1, further comprising, for a selected simplex, approximating the function as a constant over the simplex.

3. A method as claimed in claim 1, further comprising, for a selected simplex, approximating the function as a linear function over the simplex.

4. A method as claimed in claim 3 wherein step (c) comprises, for a selected simplex, determining the average of the values of the function at each vertex of the simplex.

5. A method as claimed in claim 1 further comprising: assigning a weight to each data point based on the partitioning of the integration domain.

6. A method as claimed in claim 5, wherein the function is integrated by multiplying the value of the function at each data point by the weight of the data point.

7. A method as claimed in claim 5 wherein step (b) comprises assigning weights to a data point on the basis of the distribution of neighbouring data points over the integration domain.

8. A method as claimed in any of claims 5 wherein the weight assigned to a selected data point is inversely related to the number of other data points in the vicinity of the selected data point.

9. A method as claimed in any of claims 5 wherein step (b) comprises partitioning the integration domain into a plurality of k-dimensional simplexes, where k<=n, with each vertex of a simplex being coincident with a respective one of the data points, and wherein the weight assigned to a selected data point is proportional to the volume of the simplex associated with the selected data point.

10. A method as claimed in claim 1, further comprising:
    determining the co-ordinates of a location at which it is desired to determine the value of the function, the location being within the domain and not being coincident with one of the data points; and
    determining the value of the function at the location from the values of the function at the vertices of the simplex that contains the location.

11. A method as claimed in claim 10 wherein the value of the function at the location is determined by linear interpolation from the values of the function at the vertices of the simplex that contains the location.

12. A method as claimed in claim 1, wherein k=2 whereby each simplex is a triangle.

13. A method as claimed in claim 1, wherein k=3 whereby each simplex is a tetrahedron.

14. A method as claimed in claim 1, wherein the function is a function of the geophysical data and of at least one further parameter.

15. A method as claimed in claim 1, further comprising determining one or more parameters relating to physical properties of the earth's interior from the processed geophysical data.

16. A method as claimed in claim 1, wherein the geophysical data is acquired at a plurality of discrete locations; and wherein the integral of a function of the geophysical data is used to determine one or more parameters relating to physical properties of the at least one subsurface layer.

17. A system for processing geophysical data, comprising:
    (a) means for determining an integral of a function of the geophysical data over an n-dimensional integration domain from the values of the function at a plurality of data points within the integration domain; the apparatus comprising:
    (b) means for partitioning the integration domain into a plurality of k-dimensional simplexes, where k<=n, wherein each vertex of a simplex is coincident with one of the data points;
    (c) means for integrating the function over each simplex;
    (d) means for summing the results of step (c);
    (e) means for storing the sum to a storage medium; and
    (f) means for using the sum for geophysical exploration.

18. An apparatus as claimed in claim 17, further comprising:
    means for assigning a weight to each data point based on the partitioning of the integration domain; and
    means for multiplying the value of the function at each data point by the weight of the respective data point.

19. An apparatus as claimed in claim 17, further comprising:
    means for determining the co-ordinates of a location at which it is desired to determine the value of the function, the location being within the domain and not being coincident with one of the data points; and
    means for determining the value of the function at the location from the values of the function at the vertices of the simplex that contains the location.

* * * * *